United States Patent
Isozaki et al.

(10) Patent No.: US 10,326,141 B2
(45) Date of Patent: *Jun. 18, 2019

(54) NONAQUEOUS ELECTROLYTE SECONDARY BATTERY AND BATTERY PACK

(71) Applicant: Kabushiki Kaisha Toshiba, Minato-ku (JP)

(72) Inventors: Yoshiyuki Isozaki, Tokyo (JP); Norio Takami, Yokohama Kanagawa (JP); Keigo Hoshina, Kashiwazaki Niigata (JP); Mitsuru Ishibashi, Yokohama Kanagawa (JP); Yasunobu Yamashita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,935

(22) Filed: Aug. 31, 2017

(65) Prior Publication Data

US 2017/0365857 A1  Dec. 21, 2017

Related U.S. Application Data

(63) Continuation of application No. PCT/JP2015/076312, filed on Sep. 16, 2015.

(51) Int. Cl.
*H01M 4/62* (2006.01)
*H01M 4/131* (2010.01)
(Continued)

(52) U.S. Cl.
CPC ......... *H01M 4/622* (2013.01); *B60L 11/1877* (2013.01); *B60L 11/1879* (2013.01);
(Continued)

(58) Field of Classification Search
None
See application file for complete search history.

(56) References Cited

U.S. PATENT DOCUMENTS

2013/0252077 A1  9/2013  Iwasaki et al.
2013/0323537 A1  12/2013  Iwasaki et al.
(Continued)

FOREIGN PATENT DOCUMENTS

EP  2874212 A1  5/2015
JP  2008-98590  4/2008
(Continued)

OTHER PUBLICATIONS

International Search Report PCT/JP2015/076312 dated Dec. 22, 2015.

*Primary Examiner* — Sarah A. Slifka

(74) *Attorney, Agent, or Firm* — Oblon, McClelland, Maier & Neustadt, L.L.P.

(57) ABSTRACT

According to one embodiment, a nonaqueous electrolyte secondary battery includes a positive electrode, a negative electrode, and a nonaqueous electrolyte. The negative electrode includes a negative electrode current collector and a negative electrode mixed-material layer on the negative electrode current collector. The negative electrode mixed-material layer includes a titanium-containing metal oxide and a binder including an acrylic resin. The negative electrode satisfies $\alpha/\beta > 1.36 \times 10^{-2}$, where "$\alpha$" is a peel strength (N/m) between the current collector and the negative electrode mixed-material layer, and "$\beta$" is a cutting strength (N/m) according to a surface and interfacial cutting method in the negative electrode mixed-material layer.

19 Claims, 5 Drawing Sheets

(51) Int. Cl.
*H01M 4/48* (2010.01)
*B60L 11/18* (2006.01)
*C09D 5/24* (2006.01)
*C09D 133/02* (2006.01)
*C09D 133/20* (2006.01)
*H01M 2/10* (2006.01)
*H01M 2/20* (2006.01)
*H01M 2/34* (2006.01)
*H01M 10/0525* (2010.01)

(52) U.S. Cl.
CPC ............ *C09D 5/24* (2013.01); *C09D 133/02* (2013.01); *C09D 133/20* (2013.01); *H01M 2/1077* (2013.01); *H01M 2/206* (2013.01); *H01M 2/348* (2013.01); *H01M 4/131* (2013.01); *H01M 4/48* (2013.01); *H01M 4/62* (2013.01); *H01M 10/0525* (2013.01); *H01M 2200/10* (2013.01); *H01M 2220/20* (2013.01)

(56) References Cited

U.S. PATENT DOCUMENTS

| | | | |
|---|---|---|---|
| 2014/0295248 A1 | 10/2014 | Hotta et al. | |
| 2015/0044559 A1* | 2/2015 | Toyoda | H01M 4/13 429/217 |
| 2015/0086852 A1 | 3/2015 | Matsuno et al. | |
| 2015/0086872 A1* | 3/2015 | Ise | H01M 4/485 429/231.5 |
| 2015/0303478 A1 | 10/2015 | Kinugawa et al. | |
| 2016/0126557 A1 | 5/2016 | Kataoka et al. | |

FOREIGN PATENT DOCUMENTS

| | | |
|---|---|---|
| JP | 2009-272041 | 11/2009 |
| JP | 2010-212167 | 9/2010 |
| JP | 2012-174577 | 9/2012 |
| JP | 2013-23654 | 2/2013 |
| JP | 2013-109853 | 6/2013 |
| JP | 2013-201097 | 10/2013 |
| JP | 2014-17199 | 1/2014 |
| JP | 5625007 | 10/2014 |
| JP | 2015-53152 | 3/2015 |
| JP | 2015-64988 | 4/2015 |
| JP | 2015-179565 | 10/2015 |
| JP | WO 2014 200003 A1 | 2/2017 |
| WO | 2009/128589 A1 | 10/2009 |
| WO | WO 2011-002057 | 1/2011 |
| WO | WO 2014-068905 | 5/2014 |
| WO | WO 2014-157010 | 10/2014 |
| WO | WO 2017-046896 A1 | 3/2017 |

* cited by examiner

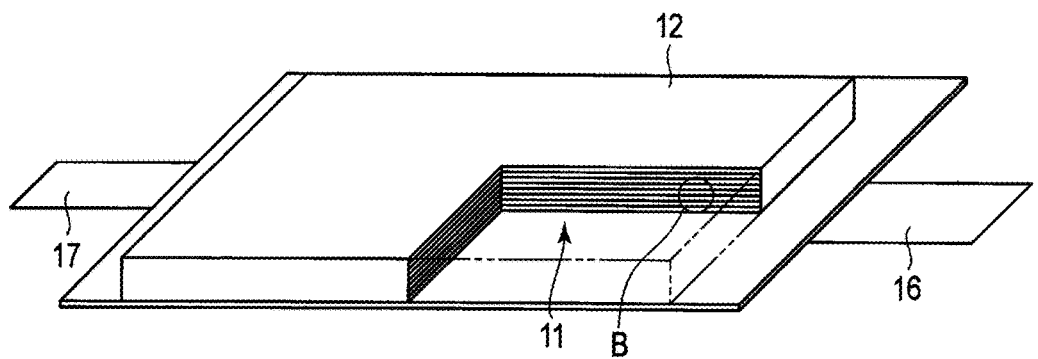
F I G. 3
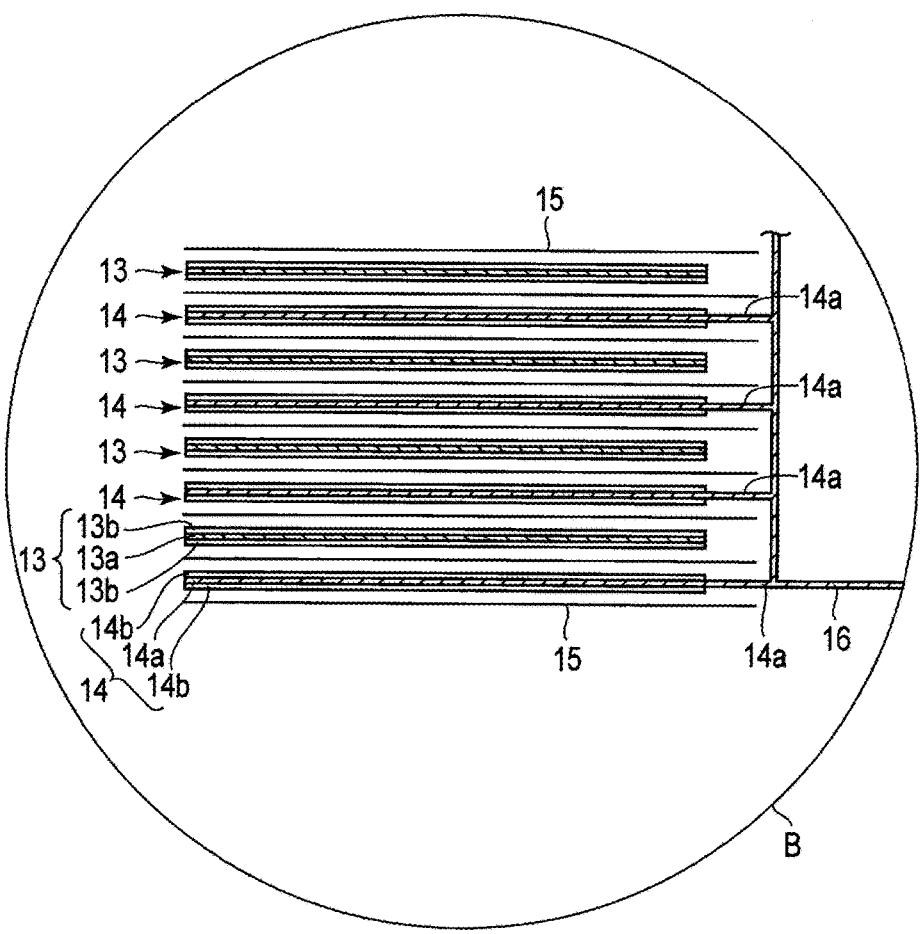
F I G. 4

NONAQUEOUS ELECTROLYTE SECONDARY BATTERY AND BATTERY PACK

CROSS-REFERENCE TO RELATED APPLICATION

This application is a Continuation application of PCT Application No. PCT/JP2015/076312, filed Sep. 16, 2015, the entire contents of all of which are incorporated herein by reference.

FIELD

Embodiments relate to a nonaqueous electrolyte secondary battery and a battery pack.

BACKGROUND

Presently, research and development have been actively conducted for a nonaqueous electrolyte secondary battery in which charging and discharging are performed by movement of Li ions between a negative electrode and a positive electrode, as a high energy density battery. Until now, a lithium ion secondary battery which includes a positive electrode including $LiCoO_2$ or $LiMn_2O_4$ as an active material and a negative electrode including a carbonaceous material where lithium is inserted and extracted has been widely commercialized for mobile devices.

The lithium ion secondary battery has been recently and widely used as power sources for environmental-friendly automobiles such as electric vehicles (EV), hybrid electric vehicles (HEV), plug-in hybrid electric vehicles (PHEV), and vehicles equipped with an idling-stop system (ISS), which are developed in view of environmental issues. When the lithium ion secondary battery is installed on a vehicle such as an electric vehicle or a hybrid electric vehicle, the lithium ion secondary battery is required to have storage performance under high temperature environments, cycle performance, high power output with long-term reliability and the like.

In addition, when the lithium ion secondary battery is installed in an engine compartment of an automobile to be used as a substitute for a lead storage battery, it is required for the lithium ion secondary battery to have high temperature durability (for example, 80° C. or more). Further, when high performance in cold regions is required, high power performance and long life performance at low temperature environment (for example, −30° C.) is needed.

Accordingly, constituent materials of batteries such as a positive electrode, a negative electrode, a separator, and an electrolyte liquid are required to be composed of materials having excellent chemical and electrochemical stability, strength, and corrosion resistance at high temperature and low temperature.

A negative electrode used in a lithium ion secondary battery has generally a structure in which a negative electrode active material layer is formed on a current collector. In addition to a negative electrode active material, a binder for binding the negative electrode active materials to each other and for binding the negative electrode active material and the current collector is used in the negative electrode active material layer.

As the binder, a fluorine-based resin (for example, polyvinylidene fluoride (PVdF)) or a modified substance thereof is generally used. However, the fluorine-based resin or the modified substance thereof easily swells with respect to the electrolyte liquid at a high temperature. Accordingly, there is concern that high temperature cycle performance may be deteriorated in a battery having a negative electrode including the fluorine-based resin or the modified substance thereof as the binder. Specifically, in the battery using such a fluorine-based resin as the binder for the negative electrode, network of an electron conduction of the negative electrode becomes disconnected as charge-and-discharge cycles proceed at a high temperature, and as a result, internal resistance of the negative electrode is increased.

Therefore, a synthetic rubbery polymer such as an acrylic resin, instead of the fluorine-based resin such as PVdF, is proposed as the binder for the negative electrode.

BRIEF DESCRIPTION OF THE DRAWINGS

FIG. 3 is a schematic diagram showing another example of a flat nonaqueous electrolyte secondary battery according to the embodiment;

FIG. 4 is an enlarged cross-sectional view showing part B of FIG. 3;

DETAILED DESCRIPTION

Figure 1:
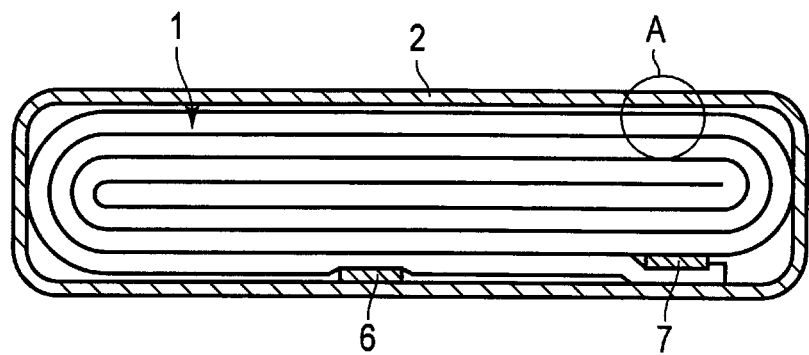
FIG. 1 is a cross-sectional view of an exemplary flat nonaqueous electrolyte secondary battery according to an embodiment.

According to one embodiment, a nonaqueous electrolyte secondary battery is provided. The nonaqueous electrolyte secondary battery includes a positive electrode, a negative electrode, and a nonaqueous electrolyte. The negative electrode includes a negative electrode current collector and a negative electrode mixed-material layer disposed on the negative electrode current collector. The negative electrode current collector includes a metallic foil. The negative electrode mixed-material layer includes a titanium-containing metal oxide having lithium ions inserted into and extracted from, and a binder that includes an acrylic resin. The negative electrode satisfies the following equation (I):

$$\alpha/\beta > 1.36 \times 10^{-2} \qquad (I).$$

In the equation, "α" represents a peel strength (N/m) between the current collector and the negative electrode mixed-material layer, and "β" represents a cutting strength (N/m) as measured according to a surface and interfacial cutting method in the negative electrode mixed-material layer.

Embodiments will be hereinafter described with reference to the accompanying drawings. In the following description of the drawings, the same or similar parts are denoted by the same or similar reference numerals, and duplicated explanations are omitted. However, it should be noted that the drawings are schematic, and relationship between a thickness and a planar dimension, a ratio of thicknesses of respective layers, and the like are different from those of actual cases. Accordingly, specific thickness and dimensions should be determined based on the following description. The drawings also include parts where dimensional relationship or proportions are mutually different from each other.

Further, embodiments described below illustrate an apparatus or a method for embodying technical idea of the invention, and thus, technical idea of the invention does not specify a material, a shape, a structure, or disposition of constituent components as described below. The technical idea of the invention may make various changes within the scope of the claims.

First Embodiment

According to the first embodiment, a nonaqueous electrolyte secondary battery is provided. The nonaqueous electrolyte secondary battery includes a positive electrode, a negative electrode, and a nonaqueous electrolyte. The negative electrode includes a negative electrode current collector that includes a metallic foil, and a negative electrode mixed-material layer disposed on the negative electrode current collector and including a negative electrode active material and a binder. The negative electrode active material included in the negative electrode mixed-material layer includes a titanium-containing metal oxide that is capable of having lithium ions be inserted and extracted. The binder includes an acrylic resin. The peel strength $\alpha$ (units: N/m) between the current collector and the negative electrode mixed-material layer, and the cutting strength $\beta$ (units: N/m) measured according to a surface and interfacial cutting method in the negative electrode mixed-material layer satisfy the relationship of $\alpha/\beta > 1.36 \times 10^{-2}$.

A nonaqueous electrolyte secondary battery according to the first embodiment will be described more concretely, with reference to FIGS. 1 and 2. FIG. 1 shows a cross-sectional view of a flat nonaqueous electrolyte secondary battery according to the first embodiment, and FIG. 2 shows an enlarged cross-sectional view of part A in FIG. 1.

A flat wound electrode group 1 is housed in a bag-like container member 2 made of a laminate film in which a metallic layer is interposed between two resin films. The flat wound electrode group 1 is formed by spirally winding and pressing a stack, in which a negative electrode 3, a separator 4, a positive electrode 5, and another separator 4 are stacked in this order from the outer side. The outermost negative electrode 3 has a configuration, in which, as shown in FIG. 1, a negative electrode mixed-material layer 3b including a negative electrode active material is formed on one inner side of a negative electrode current collector 3a. The other negative electrodes 3 are configured with the negative electrode mixed-material layer 3b formed on both of reverse sides of the negative electrode current collector 3a. The positive electrode 5 is configured with a positive electrode mixed-material layer 5b formed on both of reverse sides of a positive electrode current collector 5a.

Near an outer circumference of the wound electrode group 1, a negative electrode terminal 6 is connected to the negative electrode current collector 3a of the negative electrode 3 at the outermost. Also, near the outer circumference of the wound electrode group 1, a positive electrode terminal 7 is connected to the positive electrode current collector 5a of the positive electrode 5 on the inner side. The negative electrode terminal 6 and the positive electrode terminal 7 project out from an opening of the bag-like container member 2. For example, a liquid nonaqueous electrolyte is put in through the opening of the bag-like container member 2. The wound electrode group 1 and the liquid nonaqueous electrolyte are completely sealed by heat-sealing the opening in the bag-like container member 2. When heat-sealing, the negative electrode terminal 6 and the positive electrode terminal 7 are sandwiched by the bag-like container 2 at the opening.

Figure 2:
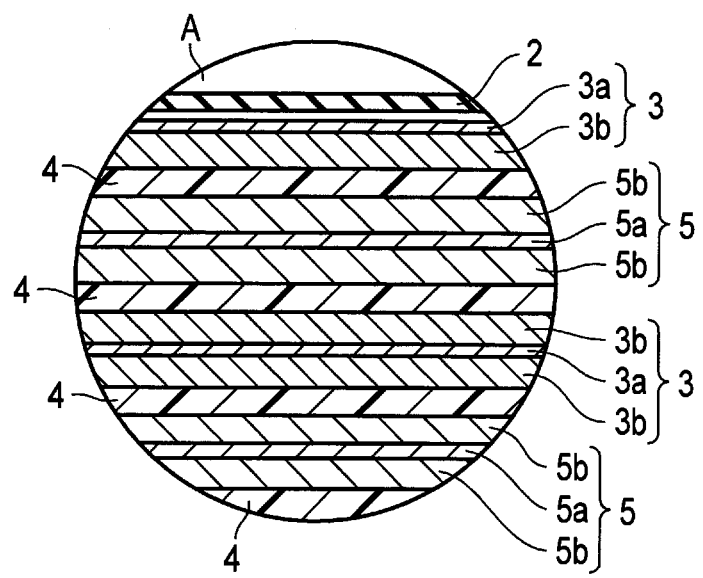
FIG. 2 is an enlarged cross-sectional view showing part A of FIG. 1.

The nonaqueous electrolyte secondary battery according to the first embodiment is not limited to the configuration shown in FIGS. 1 and 2 and may be configured, for example, as shown in FIGS. 3 and 4. FIG. 3 is a partial cutout perspective view schematically showing another flat nonaqueous electrolyte secondary battery according to the first embodiment, and FIG. 4 is an enlarged sectional view of part B in FIG. 3.

A stacked electrode group 11 is housed in a container member 12 made of a laminate film, in which a metallic layer is interposed between two resin films. The stacked electrode group 11 has, as shown in FIG. 4, a structure in which a positive electrode 13 and a negative electrode 14 are alternately stacked with separator(s) 15 interposed therebetween. A plural of the positive electrodes 13 are present, and each includes a positive electrode current collector 13a and a positive electrode mixed-material layer 13b supported on both of reverse surfaces of the positive electrode current collector 13a. A plural of the negative electrodes 14 are present, and each includes a negative electrode current collector 14a and a negative electrode mixed-material layer 14b supported on both of reverse surfaces of the negative electrode current collector 14a. One end of the negative electrode current collector 14a of each of the negative electrodes 14 protrudes from the positive electrodes 13. The protruding ends of the negative electrode current collector 14a are electrically connected to a strip-shaped negative electrode terminal 16. One end of the strip-shaped negative electrode terminal 16 is drawn out of the container member 12. Though not illustrated, one end of the positive electrode current collector 13a protrudes from the negative electrodes 14. The end of the positive electrode current collector 13a protruding from the negative electrodes 14 is positioned on the side opposite to the protruding ends of negative electrode current collector 14a. The protruding ends of positive electrode current collector 13a are electrically connected to a strip-shaped positive electrode terminal 17. One end of the strip-shaped positive electrode terminal 17 is positioned opposite to the negative electrode terminal 16 and is drawn out of the container member 12.

Hereinafter, the negative electrode, the positive electrode, the nonaqueous electrolyte, the separator, the container member, the positive electrode terminal, and the negative electrode terminal used in the nonaqueous electrolyte secondary battery according to the embodiment will be described in detail.

(Negative Electrode)

A negative electrode used in a lithium ion secondary battery generally has a structure in which a negative electrode active material layer (negative electrode mixed-material layer) is formed on a current collector. In addition to a negative electrode active material, a binder for binding the negative electrode active materials to each other and for binding the negative electrode active material and the current collector is used in the negative electrode mixed-material layer.

A fluorine-based resin (for example, PVdF) or a modified substance thereof, which are binders, easily swells with respect to the nonaqueous electrolyte at a high temperature. Accordingly, in a battery including a negative electrode using the fluorine-based resin or the modified substance as the binder, network of electron conduction of the negative electrode becomes disconnected as charge-and-discharge cycles proceed at a high temperature. As a result, internal resistance of the negative electrode is increased, which deteriorates a high temperature cycle performance of the battery.

Meanwhile, an acrylic resin is a binder which does not swell as much at a high temperature with respect to the nonaqueous electrolyte as compared with the fluorine-based resin (e.g., PVdF) or the modified substance thereof. However, when the acrylic resin is used as the binder, defects may occur when the negative electrode is produced. Indeed, the present inventors attempted to produce a negative electrode using the acrylic resin as the binder, and as a result, the following defects were found. Specifically, the acrylic resin as the binder, an active material, and carbon as an electro-conductive agent were dispersed in a dispersant (N-methyl-2-pyrrolidone) to prepare a slurry. The slurry was applied onto an aluminum foil as the current collector. Here, the slurry was repelled from the aluminum foil, such that the slurry could not be applied with a desired film thickness. Otherwise, even though the slurry was able to be applied, it was found that adhesion property between the current collector and the negative electrode mixed-material layer was deteriorated.

This phenomenon is particularly remarkable when titanium-containing metal oxide is used as the negative electrode active material. Accordingly, when titanium-containing metal oxide is used as the negative electrode active material in the nonaqueous electrolyte secondary battery, it is difficult to obtain a nonaqueous electrolyte secondary battery having excellent output performance while simultaneously having excellent high temperature durability (cycle performance) only by simply replacing the binder with an acrylic resin for the purpose of improvement in high temperature durability of the battery, without implementing any measures.

In the nonaqueous electrolyte secondary battery according to the first embodiment, the negative electrode includes the negative electrode mixed-material layer that includes a titanium-containing metal oxide where lithium ions are inserted and extracted and a binder that includes an acrylic resin. The negative electrode current collector includes a metallic foil. In the case where the peel strength between the current collector and the negative electrode mixed-material layer is represented by $\alpha$ (N/m), and the cutting strength measured by the surface and interfacial cutting method in the negative electrode mixed-material layer is represented by $\beta$ (N/m), $\alpha$ and $\beta$ satisfy the relationship of $\alpha/\beta > 1.36 \times 10^{-2}$. Using the negative electrode produced so as to have the above configuration by suitably controlling the production condition, the nonaqueous electrolyte secondary battery having excellent output performance and high temperature durability (cycle performance) can be obtained.

The negative electrode included in the nonaqueous electrolyte secondary battery according to the embodiment includes a negative electrode current collector and a negative electrode mixed-material layer. The negative electrode mixed-material layer includes a negative electrode active material, an electro-conductive agent, and a binder. The negative electrode mixed-material layer is formed on one surface or both of reverse surfaces of the negative electrode current collector.

As described later, in manufacturing the negative electrode, the negative electrode mixed-material layer is formed by applying a slurry including materials of the negative electrode mixed-material layer onto the negative electrode current collector. When the acrylic resin is used as the binder and an aluminum foil is used as the current collector, the binder may preferentially bind between the active materials, and as a result, adhesion property between the current collector and the mixed-material layer may be deteriorated. In the above-described negative electrode that satisfies a relationship between the peel strength $\alpha$ and the cutting strength $\beta$ of $\alpha/\beta > 1.36 \times 10^{-2}$, the negative electrode active materials are not bound together preferentially over binding between the negative electrode mixed-material layer and the negative electrode current collector. Therefore, such a negative electrode has excellent adhesion properties between the negative electrode mixed-material layer and the negative electrode current collector.

It is preferred that the peel strength $\alpha$ between the current collector and the negative electrode mixed-material layer, and the cutting strength $\beta$ in the negative electrode mixed-material layer further satisfy the relationship of $\alpha/\beta < 4.9 \times 10^{-2}$. That is, the negative electrode is preferred to satisfy both of the following equations (I) and (II):

$$\alpha/\beta > 1.36 \times 10^{-2} \quad (I); \text{ and}$$

$$\alpha/\beta < 4.9 \times 10^{-2} \quad (II).$$

In the equations, "$\alpha$" represents a peel strength (N/m) between the negative electrode current collector and the negative electrode mixed-material layer, and "$\beta$" represents a cutting strength (N/m) measured by a surface and interfacial cutting method in the negative electrode mixed-material layer.

In the negative electrode, if $\alpha/\beta$ is equal to or greater than $4.9 \times 10^{-2}$, there may be a case where excellent high temperature durability is not obtained.

In addition, the peel strength $\alpha$ between the negative electrode current collector and the negative electrode mixed-material layer is preferred to range from 2.5 N/m to 27 N/m. When the peel strength $\alpha$ is less than 2.5 N/m, the adhesion property between the mixed-material layer and the current collector is insufficient, which may hinder production of the negative electrode. Further, the negative electrode mixed-material layer may be peeled off from the negative electrode current collector upon charge-and-discharge cycles, such that resistance of a battery may be increased, which may deteriorate the cycle performance. When the peel strength $\alpha$ is more than 27 N/m, the negative electrode itself is hard and easily becomes brittle. In this case, it is easy to hinder production of the battery. The peel strength $\alpha$ between the negative electrode current collector and the negative electrode mixed-material layer is more preferably from 3.5 N/m to 10 N/m.

The cutting strength $\beta$ in the negative electrode mixed-material layer measured by the surface and interfacial cutting method is preferred to range from 180 N/m to 900 N/m. The cutting strength $\beta$ in the negative electrode mixed-material layer may correspond to the shearing force of the negative electrode mixed-material layer. When the cutting strength $\beta$ is less than 180 N/m, the strength of the negative electrode mixed-material layer may be insufficient. When the cutting strength $\beta$ is more than 900 N/m, there may be a case where the negative electrode mixed-material layer is unable to withstand swelling and contraction due to charge and discharge of a battery. The cutting strength $\beta$ is preferred to be 600 N/m or less.

In the nonaqueous electrolyte secondary battery according to the first embodiment, the negative electrode mixed-material layer includes as the negative electrode active material, a titanium-containing metal oxide into which lithium ions are inserted and from which lithium ions are extracted.

Examples of the titanium-containing metal oxide, which may be used include at least one selected from the group consisting of spinel type lithium titanate, monoclinic titanium composite oxide, niobium-titanium composite oxide represented by General Formula $Ti_{1-x}M_{x+y}Nb_{2-y}O_{7-\delta}$ ($0 \leq x \leq 1$, $0 \leq y < 1$, M is at least one selected from the group consisting of Mg, Fe, Ni, Co, W, Ta, and Mo), and orthorhombic Na-including niobium-titanium composite oxide represented by General Formula $Li_{2+v}Na_{2-w}M1_xTi_{6-y-z}Nb_yM2_zO_{14+\delta}$, ($0 \leq v \leq 4$, $0 < w < 2$, $0 \leq x < 2$, $0 < y < 6$, $0 \leq z < 3$, $-0.5 \leq \delta \leq 0.5$, M1 is at least one kind of metal element selected from the group consisting of Cs, K, Sr, Ba, and Ca, and M2 is at least one kind selected from the group consisting of Zr, Sn, V, Ta, Mo, W, Fe, Co, Mn, and Al).

In the nonaqueous electrolyte secondary battery according to the first embodiment, the negative electrode mixed-material layer may include an electro-conductive agent. Examples of the electro-conductive agent may include carbonaceous materials such as graphite, acetylene black, carbon black, carbon nanofiber, and carbon nanotube. These carbonaceous materials may be used alone, or plural carbonaceous materials may be used.

In addition, in the nonaqueous electrolyte secondary battery according to the first embodiment, the binder includes an acrylic resin (acrylic polymer). The acrylic resin may be a polymer or a copolymer. Alternatively, the acrylic resin may include both the polymer and the copolymer.

The acrylic resin hardly swells with respect to the nonaqueous electrolyte at a high temperature, and even when the charge-and-discharge cycles are repeated at a high temperature, the network of electron conduction of the negative electrode is maintained. Accordingly, in the battery including the negative electrode using the acrylic resin, an increase of battery resistance at a high temperature is suppressed, such that a high temperature cycle performance of the battery is improved.

Examples of a monomer constituting the acrylic resin (acrylic polymer) include a monomer having an acrylic group and a monomer having a methacryl group. The monomer having an acrylic group is typically acrylic acid or acrylate. The monomer having a methacryl group is typically methacrylic acid or methacrylate.

Examples of the monomer constituting the acrylic resin (acrylic polymer) include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, styrene, and acrylamide.

As the acrylic resin (acrylic polymer), it is preferred to use a resin mainly composed of an acrylic resin including a nitrile group. Specifically, a resin mainly composed of polyacrylonitrile may be used. These binders are particularly strong in interaction with titanium-containing metal oxides as the negative electrode active material. It is presumably because an interaction between a surface functional group (nitrile group) in the acrylic resin such as polyacrylonitrile and a surface of the titanium-containing metal oxides is strong. When such a binder is used, the above-described defects at the time of manufacturing the negative electrode occur easily. Accordingly, when a binder mainly composed of the acrylic resin including a nitrile group is used, it may be expected that the effect is more remarkably exhibited by adopting the configuration of the embodiment.

As the binder, two or more kinds of acrylic resins may be mixed and used. In addition, one or more kinds of binders other than the acrylic resin may be included.

Examples of the binder other than the acrylic resin may include polyvinylidene fluoride (PVdF), other fluorinated rubber, polypropylene (PP), polyethylene (PE), carboxymethyl cellulose (CMC), polyimide (PI), and polyamideimide (PAI).

A proportion of the binder other than the acrylic resin is preferably 30 wt % or less of all the binders included in the negative electrode. More preferably, the proportion of the binder other than the acrylic resin is 10 wt % or less.

The negative electrode active material, the electro-conductive agent, and the binder are preferably mixed at a mixing ratio as follows. The negative electrode active material preferably has a mixing ratio ranging from 70 mass % to 96 mass %. The negative electrode electro-conductive agent preferably has a mixing ratio ranging from 2 mass % to 28 mass %. The binder preferably has a mixing ratio ranging from 2 mass % to 28 mass %.

When an amount of the electro-conductive agent is less than 2 mass %, current collecting performance of the negative electrode mixed-material layer may be lowered, and a high current performance of the nonaqueous electrolyte secondary battery may be lowered. In addition, when an amount of the binder is less than 2 mass %, the binding property between the negative electrode mixed-material layer and the negative electrode current collector is lowered, and as a result, the resistance is increased, which may deteriorate the cycle performance. On the other hand, in view of high capacity, it is preferred that each of the electro-conductive agent and the binder has an amount of 28 mass % or less.

A weight per unit area of the negative electrode mixed-material layer is preferably 10 $g/m^2$ to 160 $g/m^2$. Here, in the case that the negative electrode mixed-material layer is coated on both of reverse surfaces of the negative electrode current collector, the weight per unit area of the negative electrode mixed-material layer refers to a weight of the negative electrode mixed-material layer per either surface. Production of the negative electrode mixed-material layer in which the weight per unit area is less than 10 $g/m^2$ is not suitable for a mass production process. Further, when the weight per unit area of the negative electrode mixed-material layer is more than 160 $g/m^2$, production of the negative electrode is apt to be hindered. A more preferable range of the weight per unit area of the negative electrode mixed-material layer is 25 $g/m^2$ to 140 $g/m^2$.

It is preferred that the negative electrode mixed-material layer disposed on the negative electrode current collector has a thickness per one surface of the current collector of 10 μm to 100 μm. A more preferable range of the thickness is 15 μm to 75 μm.

As the negative electrode current collector, an electro-conductive foil may be used. Such a current collector may be, for example, a metal foil or a foil made of an alloy. It is preferred to use an aluminum foil or an aluminum alloy foil as the negative electrode current collector. The aluminum foil and the aluminum alloy foil preferably have a thickness of 20 μm or less, and more preferably, 15 μm or less. Accordingly, it is possible to reduce weight while maintaining strength of the negative electrode. The aluminum foil preferably has a purity of 99 wt % or more. As the aluminum alloy, alloys including elements such as Mg, Zn, and Si are preferred. On the other hand, when transition elements such as Fe, Cu, Ni, and Cr are included, content thereof is preferably 1 wt % or less.

It is more preferred that an undercoat layer is further formed on the surface of the negative electrode current collector. When a metal foil including an undercoat layer formed on a surface thereof is used as the current collector, wettability of the surface of the current collector to the slurry for forming the negative electrode mixed-material layer is improved. By doing so, the adhesion property between the negative electrode current collector and the negative electrode mixed-material layer may be further improved. This is because, for example, it is possible to suppress occurrence of a phenomenon in which the slurry is repelled from the aluminum foil as the current collector, which is a so-called repellent phenomenon, and to prevent deterioration of the peel strength between the current collector and the mixed-material layer. That is, by forming the undercoat layer on the surface the current collector, the defects at the time of manufacturing the negative electrode as described above may be more suppressed, thereby improving the adhesion property between the negative electrode current collector and the negative electrode mixed-material layer.

When an acrylic resin is used as the binder and an aluminum foil is used, for example, as the current collector, if the undercoat layer is not formed on the surface the current collector, the binder may preferentially bind between the active materials as described above. It is expected that the reason is because of the interaction between a surface of the active material and a surface functional group of the binder. By forming the undercoat layer on the surface the current collector, it is possible to avoid the binder from being preferentially used for binding between the active materials due to the interaction between the active material and the acrylic resin. Accordingly, it is possible to produce a negative electrode having excellent adhesion property between the current collector and the mixed-material layer at a higher probability.

It is preferred that the undercoat layer formed on the surface of the negative electrode current collector includes a carbon material, and the thickness per one surface of the current collector is 2 µm or less. The carbon material included in the undercoat layer may be graphite, acetylene black, or carbon black. In addition, the undercoat layer may include a resin.

The undercoat layer may include a resin. The resin included in the undercoat layer may be fluorine-based resin (PVdF, and the like.), polyacrylic acid, acrylic resin, polyolefin resin, polyimide (PI), polyamide (PA), polyamidemide (PAI), and the like. The resin included in the undercoat layer is preferred to be an acrylic resin. This is because by having the undercoat layer include an acrylic resin, affinity becomes excellent between the undercoat layer and the acrylic resin included as a binder in the negative electrode mixed-material layer.

The negative electrode included in the nonaqueous electrolyte secondary battery according to the first embodiment may be produced, for example, by the following method. First, a slurry is prepared by suspending the negative electrode active material, the electro-conductive agent, and the binder in a solvent. The slurry is applied to one surface or both of reverse surfaces of the negative electrode current collector. Subsequently, the applied slurry is dried to form the negative electrode mixed-material layer. Then, the current collector and the negative electrode mixed-material layer are subjected to press processing. Here, the ratio ($\alpha/\beta$) between the peel strength $\alpha$ and the cutting strength $\beta$ in the negative electrode may be made to have an appropriate value by controlling conditions of the method for manufacturing the negative electrode.

The peel strength $\alpha$ between the negative electrode mixed-material layer and the negative electrode current collector may vary depending on kinds of materials such as the active material or the binder, used for the negative electrode mixed-material layer, but is also affected by conditions for manufacturing the negative electrode. As described later, in manufacturing the negative electrode, the slurry including the negative electrode active material, the electro-conductive agent, and the binder is applied onto the negative electrode current collector, but the peel strength $\alpha$ may vary depending on an application speed of the slurry or the thickness of a coating film. For example, as a result of reducing the application speed, the peel strength $\alpha$ may be increased. Further, while the negative electrode mixed-material layer is formed by drying the slurry applied on the negative electrode current collector, the peel strength $\alpha$ may vary depending on a drying temperature at this time.

The cutting strength $\beta$ may vary depending on kinds of materials such as the active material or the binder, used for the negative electrode mixed-material layer, and at the same time, is also affected by conditions for manufacturing the negative electrode, similar to the peel strength $\alpha$. The cutting strength $\beta$ may vary depending on the thickness of the slurry applied onto the negative electrode current collector. Further, in the production of the negative electrode, while the current collector and the negative electrode mixed-material layer formed thereon are subjected to the press processing as described above, the cutting strength $\beta$ may also be changed depending on a press temperature at that time, i.e., a temperature of a roll used for the press processing.

A method for forming the undercoat layer on the current collector is not particularly limited, but for example, the following method may be used. First, a carbon material such as graphite, acetylene black, or the like, is mixed with a solution in which the above-described resin is dissolved in a solvent, thereby preparing a coating material. The coating material is applied onto an aluminum foil as a current collector, and then, dried to produce a current collector including an undercoat layer formed on a surface thereof. This current collector may be used to produce the negative electrode as described above by applying a slurry including a negative electrode active material, an electro-conductive agent, and a binder onto a surface (one surface or both of reverse surfaces) on which the undercoat layer is formed.

The peel strength $\alpha$ between the current collector and the negative electrode mixed-material layer in the negative electrode may be measured by using an electrode peel strength measurement device (rheometer). A measurement method is described below. First, the specimen negative electrode is cut out in a form of a rectangle of 2×5 cm as a measurement sample. Next, a tape is attached to a surface of the negative electrode mixed-material layer of each measurement sample. The tape used here may be, for example, 3M Scotch (registered trademark) double-sided tape 665 (25 mm core). When the tape is subjected to the electrode peel strength measurement device, the negative electrode mixed-material layer is peeled from the negative electrode current collector at a peeling angle of 180 degrees and with a peeling rate of 2 cm/min. At the time when the negative electrode mixed-material layer is peeled from the negative electrode current collector by 2 cm, the force required for peeling of the negative electrode mixed-material layer is recorded, and converted into a suitable unit to obtain the peel strength (N/m). Here, converting the force into a suitable unit means converting the force into a unit used for the cutting strength measured by the surface and interfacial cutting method as explained below.

The cutting strength $\beta$ in the negative electrode mixed-material layer may be measured by the surface and interfacial cutting method. The surface and interfacial cutting method is a method in which cutting is performed by using a fine and sharp blade in a horizontal direction while controlling the depth of the blade relative to a sample surface, and the stress applied to the blade is measured. Specifically, by performing cutting while maintaining the depth of the blade to be a predetermined depth relative to the negative electrode mixed-material layer, the cutting strength in the negative electrode mixed-material layer can be measured. The cutting is performed at a predetermined constant rate in a length direction of the current collector (horizontal direction). At this time, the cutting strength β (N/m) in the negative electrode mixed-material layer is obtained based on the stress applied to an end of the blade when cutting the negative electrode mixed-material layer.

The measurement of the cutting strength according to the surface and interface cutting method may be performed by using a cutting strength measurement device such as a surface and interfacial cutting analysis system (SAICAS) (registered trademark). The surface and interface cutting method may also be called SAICAS method. As a blade, for example, a ceramic knife made of borazon and having a knife width of 1.0 mm is used. As measurement conditions, for example, a knife angle has a rake angle of 20 degrees and a clearance angle of 10 degrees. In the measurement of the cutting strength, first, cutting is performed at a constant speed with a horizontal velocity of 2 μm/second and a vertical velocity of 0.2 μm/second, thereby moving a blade to a predetermined depth in the negative electrode mixed-material layer. After reaching a depth of 6 μm from the surface of the negative electrode, the cutting in a vertical direction is stopped and the cutting strength is measured in a constant speed mode at a horizontal speed of 2 μm/second. Both a measurement temperature and a sample temperature are set to be at room temperature (25° C.).

The presence of an acrylic resin as a binder in the negative electrode mixed-material layer may be examined, for example, by infra-red spectroscopy (IR) analysis or pyrolysis-gas chromatography-mass/spectrometry (Py-GC/MS).

When using the infra-red spectroscopy (IR) measurement, the component of the binder in the negative electrode mixed-material layer may be examined, for example, in the following manner. First, a battery which is in a fully discharged state is disassembled in a glove box filled with argon. The fully discharged state means a state where the state of charge (SOC) is 0%. A negative electrode to be measured is taken out from the disassembled battery.

The negative electrode is washed with an appropriate solvent. The solvent used for washing may be, for example, ethyl methyl carbonate. The washed negative electrode is immersed into an organic solvent such as N-methyl-2-pyrrolidone (NMP), dimethylformamide (DMF), and the like, and ultrasonic vibration is applied to the negative electrode so as to extract a binder resin from the negative electrode mixed-material layer. Then, a solid part is filtered from the extracted solvent, and the filtrate is spilled onto a metallic plate that has been subjected to mirror processing. After that, the filtrate of the extracted solvent is heated and dried on the metallic plate.

After drying the solvent, IR measurement is performed on the remnant solid by a reflective measurement method, for example. As an IR measurement device, the FT/IR-6100 DTGS detector manufactured by JASCO may be used, for example. By analyzing the data obtained as above, the presence of an acrylic resin in the negative electrode mixed-material layer can be examined.

When a pyrolysis-gas chromatography/mass spectrometry (Py-GC/MS) is used, the component of the binder in the negative electrode mixed-material layer can be examined by the following procedure. In the same manner as for the case of using the IR measurement, the negative electrode is extracted from the disassembled battery, and washed. The negative electrode mixed-material layer is peeled off from the negative electrode after washing, using a spatula type tool. This process should be performed with caution so that the negative electrode current collector is not included.

The peeled mixed-material layer is set on a measurement holder and measured. The measurement holder is preferably a stainless steel sample cup in which its surface is inactivated. An amount of the sample is preferably about 1 mg.

The Py-GC/MS measurement device may be, for example, PY-2020 id manufactured by Frontier Laboratories Ltd., as the Py (pyrolyzer), and 7890 GC/5975 CMSD manufactured by Agilent Technologies Japan, Ltd., as the GS/MS connected thereto. In this device, the sample can be automatically dropped into the center of the furnace of the pyrolysis apparatus using an automatic sampler. In this case, it is preferred that a pyrolysis temperature is set to be 600° C. in the measurement. Decomposition of the sample is performed in a stream of helium carrier gas at 50 ml/min, and a product is introduced online to the GC/MS via a splitter of 50:1. At this time, a temperature of an interface part connecting the pyrolysis apparatus to the GC/MS, and a temperature of a sample introduction part of the GC/MS are set to 320° C. A separation column may be a non-polar column, for example, a separation column including non-polar chemically bonded poly (5% phenyl) methylsiloxane as a fixed phase (film thickness of 0.25 μm). Detection of the separated product is performed by a quadrupole mass spectrometer directly connected thereto. The presence of the acrylic resin in the negative electrode mixed-material layer may be examined by analyzing thus-obtained data.

The presence of the undercoat layer on the surface of the negative electrode current collector may be examined by observing a cross section of the negative electrode using scanning electron microscope (SEM) and performing elemental analysis with energy dispersive X-ray spectroscopy (EDX). First, a battery in a fully discharged state (SOC 0%) is disassembled in a glove box filled with argon. A negative electrode including the undercoat layer, which is the measurement target, is taken out from the disassembled battery. The negative electrode is washed with an appropriate solvent. The solvent used for washing may be, for example, ethyl methyl carbonate. When the washing is insufficient, it may be difficult to observe the undercoat layer due to an effect of lithium carbonate, lithium fluoride, or the like, remaining in the negative electrode.

The cross-section of the negative electrode taken out as described above is cut with an ion milling device. The cross-section of the cut negative electrode is attached to an SEM sample stand. Here, a treatment is performed using an electro-conductive tape and the like, so that the negative electrode is not peeled off or partially detached from the sample stand. The negative electrode attached to the SEM sample stand is observed using the scanning electron microscope (SEM). It is preferred to introduce the negative electrode into a sample chamber in a state in which the negative electrode is maintained under an inert atmosphere at the time of the measurement with the SEM.

In a case where it is difficult to examine whether there is the undercoat layer on the surface of the negative electrode current collector in SEM observation, it is possible to examine the presence or absence of the undercoat layer by performing element mapping using EDX. By performing SEM-EDX analysis, it is possible to visualize where elements are distributed, and thus, the presence or absence of the undercoat layer on the surface of the negative electrode current collector may be examined in more detail.

(Positive Electrode)

The positive electrode may include a positive electrode current collector and a positive electrode active material layer (positive electrode mixed-material layer). The positive electrode mixed-material layer may include a positive electrode active material, an electro-conductive agent, and a binder. The positive electrode mixed-material layer may be formed on one surface or both of reverse surfaces of the positive electrode current collector.

Examples of the positive electrode active material include manganese dioxide ($MnO_2$), iron oxide, copper oxide, nickel oxide, lithium-manganese composite oxide having a spinel structure (for example, $Li_xMn_2O_4$ or $Li_xMnO_2$), lithium-nickel composite oxide (for example, $Li_xNiO_2$), lithium-cobalt composite oxide (for example, $LiCoO_2$), lithium-nickel-cobalt composite oxide (for example, $LiNi_{1-y}Co_yO_2$), lithium-manganese-cobalt composite oxide (for example, $Li_xMn_yCo_{1-y}O_2$), lithium-nickel-cobalt-manganese composite oxide (for example, $LiNi_{1-y-z}Co_yMn_zO_2$), lithium-nickel-cobalt-aluminum composite oxide (for example, $LiNi_{1-y-z}Co_yAl_zO_2$), lithium-manganese-nickel composite oxide having a spinel structure (for example, $LiMn_xMn_{2-y}Ni_yO_4$), lithium phosphate having an olivine structure (for example, $Li_xFePO_4$, $Li_xMnPO_4$, $Li_xMn_{1-y}Fe_yPO_4$, $Li_xCoPO_4$), iron sulfate ($Fe_2(SO_4)_3$), and vanadium oxide (for example, $V_2O_5$), into which lithium is inserted. In the above, it is preferred that $0<x\leq1$, $0<y<1$, and $0\leq z\leq1$. As the active material, these compounds may be used alone, or plural compounds may be used in combination.

Among them, the lithium-manganese composite oxide ($Li_xMn_2O_4$), the lithium-cobalt composite oxide ($Li_xCoO_2$), the lithium-nickel-cobalt composite oxide ($Li_xNi_{1-y}Co_yO_2$), the lithium-manganese-cobalt composite oxide ($Li_xMn_yCo_{1-y}O_2$), the lithium-nickel-cobalt-manganese composite oxide (for example, $LiNi_{1-y-z}Co_yMnZO_2$), and the lithium phosphate having the olivine structure (for example, $Li_xFePO_4$, $Li_xMnPO_4$, $Li_xMn_{1-y}Fe_yPO_4$, $Li_xCoPO_4$) are preferred. In the above, it is preferred that $0<x\leq1$, $0\leq y\leq1$, and $0\leq z\leq1$ are satisfied.

Examples of the electro-conductive agent include carbonaceous materials such as acetylene black, carbon black, graphite, carbon nanofiber, and carbon nanotube. These carbonaceous materials may be used alone, or plural carbonaceous materials may be used.

The binder fills gaps among dispersed positive electrode active materials to bind the positive electrode active material and the electro-conductive agent, and to bind the positive electrode active material and the positive electrode current collector.

Examples of the binder may include, for example, polytetrafluoroethylene (PTFE), polyvinylidene fluoride (PVdF), polyvinylidene fluoride modified product (PVdF modified product), polyimide (PI), polyamideimide (PAI), and an acrylic resin (acrylic polymer).

Among them, the acrylic resin (acrylic polymer) does not easily swell with respect to the nonaqueous electrolyte at a high temperature, and even when charge-and-discharge cycles are repeated at a high temperature, network of electron conduction of the positive electrode is maintained. Accordingly, in the battery including the positive electrode using the acrylic resin as the binder, an increase of battery resistance at a high temperature is suppressed, and a high temperature cycle performance of the battery is improved, therefore preferable.

The acrylic resin (acrylic polymer) may be a polymer or a copolymer. Alternatively, the acrylic resin may include both the polymer and the copolymer.

Examples of a monomer constituting the acrylic resin (acrylic polymer) include a monomer having an acrylic group and a monomer having a methacryl group. The monomer having an acrylic group is typically acrylic acid or an acrylate. The monomer having a methacryl group is typically methacrylic acid or a methacrylate.

Examples of the monomer constituting the acrylic resin (acrylic polymer) include ethyl acrylate, methyl acrylate, butyl acrylate, 2-ethylhexyl acrylate, isononyl acrylate, hydroxyethyl acrylate, methyl methacrylate, glycidyl methacrylate, acrylonitrile, styrene, and acrylamide.

As the acrylic resin (acrylic polymer), it is preferred to use a resin mainly composed of an acrylic resin including a nitrile group. Specifically, a resin mainly composed of polyacrylonitrile may be used. In addition, as the binder, two or more kinds of acrylic resins may be mixed and used.

In addition, one or more kinds of binders other than the acrylic resin may be included. Examples of the binder other than the acrylic resin may include polyvinylidene fluoride (PVdF), other fluorinated rubber, polypropylene (PP), polyethylene (PE), carboxymethyl cellulose (CMC), polyimide (PI), and polyamideimide (PAI).

A proportion of the binder other than the acrylic resin is preferably 30 wt % or less of all the binders included in the positive electrode. More preferably, the proportion is 10 wt % or less.

The positive electrode active material, the electro-conductive agent, and the binder in the positive electrode layer are preferably mixed at a mixing ratio as follows. The positive electrode active material preferably has a mixing ratio of 80 mass % to 95 mass %. The electro-conductive agent preferably has a mixing ratio of 3 mass % to 18 mass %. The binder preferably has a mixing ratio of 2 mass % to 17 mass %.

The proportion of the electro-conductive agent is set to be 3 mass % or more, such that the network of electron conduction is maintained even when the charge-and-discharge cycles are repeated at a high temperature. Accordingly, an increase in battery resistance at a high temperature is suppressed. Further, the proportion of the electro-conductive agent is set to be 18 mass % or less, such that decomposition of the nonaqueous electrolyte on the surface of the electro-conductive agent under high temperature storage may be reduced.

The proportion of the binder is set to be 2 mass % or more, such that a sufficient positive electrode strength is obtained. The proportion of the binder is set to be 17 mass % or less, such that a mixing amount of the binder, which serves as an insulation material in the positive electrode, may be reduced, and thus internal resistance of the positive electrode can be reduced.

The positive electrode current collector is preferably an aluminum foil or an aluminum alloy foil including at least one element selected from the group consisting of Mg, Zn and Si.

The aluminum foil and the aluminum alloy foil preferably have a thickness of 20 μm or less, and more preferably, 15 μm or less. The aluminum foil preferably has a purity of 99 wt % or more. When transition elements such as Fe, Cu, Ni, and Cr are included, content thereof is preferably 1 wt % or less.

The positive electrode mixed-material layer preferably has a density of 3 $g/cm^3$ or more.

The positive electrode may be produced, for example, by the following method. A slurry is prepared by suspending a positive electrode active material, a binder and an electro-conductive agent in an appropriate solvent. This slurry is applied onto a surface of the positive electrode current collector. Subsequently, the applied slurry is dried to form the positive electrode mixed-material layer. Then, the positive electrode current collector and the positive electrode mixed-material layer are subjected to press processing. Examples of the organic solvent for dispersing the binder include N-methyl-2-pyrrolidone (NMP) and dimethylformamide (DMF). In addition, the positive electrode may be produced by forming the positive electrode active material, the binder and the electro-conductive agent into a pellet form to produce the positive electrode layer, and disposing the positive electrode layer on the positive electrode current collector.

(Nonaqueous Electrolyte)

Examples of the nonaqueous electrolyte may include a liquid organic electrolyte prepared by dissolving an electrolyte in an organic solvent, a gel-like organic electrolyte including a composite of a liquid organic solvent and a polymeric material, and a solid nonaqueous electrolyte including a composite of a lithium salt electrolyte and a polymeric material. In addition, a room temperature molten salt (ionic melt) including lithium ions may be used as the nonaqueous electrolyte. Examples of the polymeric material may include polyvinylidene fluoride (PVdF), polyacrylonitrile (PAN), and polyethylene oxide (PEO).

The nonaqueous electrolyte is preferably a liquid or a gel, has a boiling point of 100° C. or higher, and includes an organic electrolyte or the room temperature molten salt.

A liquid organic electrolyte may be prepared by dissolving an electrolyte in an organic solvent at a concentration of 0.5 mol/L to 2.5 mol/L. Accordingly, it is possible to obtain a high output even in a low temperature environment. A more preferable range of an electrolyte concentration in the organic electrolyte is 1.5 mol/L to 2.5 mol/L. The liquid nonaqueous electrolyte may be also referred to as "nonaqueous electrolyte liquid".

Examples of the electrolyte may include lithium tetrafluoroborate ($LiBF_4$), lithium hexafluorophosphate ($LiPF_6$), lithium hexafluoro arsenate ($LiAsF_6$), lithium perchlorate ($LiClO_4$), lithium trifluoromethanesulfonate ($LiCF_3SO_3$), lithium bis(trifluoromethylsulfonylimide) ($LiN(CF_3SO_2)_2$), lithium bispentafluoroethylsulfonylimide ($LiN(C_2F_5SO_2)_2$), lithium tris trifluoromethylsulfonate ($Li(CF_3SO_2)_3C$), lithium oxalate difluoroborate ($LiBF_2C_2O_4$), and lithium bisoxalate borate ($LiB[(OCO)_2]_2$). One kind of the electrolyte or two or more kinds thereof may be used. Among them, it is preferred to include the lithium hexafluorophosphate ($LiPF_6$) since it hardly becomes oxidized even at a high electric potential.

Examples of the organic solvent may include cyclic carbonates such as propylene carbonate (PC) and ethylene carbonate (EC), linear carbonates such as diethyl carbonate (DEC), dimethyl carbonate (DMC), and methyl ethyl carbonate (MEC), linear ethers such as dimethoxyethane (DME) and diethoxyethane (DEE), cyclic ethers such as tetrahydrofuran (THF) and dioxolane (DOX), gamma-butyrolactone (GBL), acetonitrile (AN), and sulfolane (SL). These organic solvents may be used alone or in a mixture form of two or more thereof.

In particular, a nonaqueous solvent that includes at least one kind of a first solvent selected from the group consisting of propylene carbonate (PC), ethylene carbonate (EC) and gamma-butyrolactone (GBL); and a second solvent including at least one kind of linear carbonate selected from the group consisting of diethyl carbonate (DEC), methyl ethyl carbonate (MEC), and dimethyl carbonate (DMC) has high stability at a high electric potential of 4.4 V to 4.5 V. Accordingly, when such the nonaqueous solvent is used, it is possible to improve cycle life performance of a nonaqueous electrolyte secondary battery. In particular, the nonaqueous solvent including ethylene carbonate and diethyl carbonate is stable at a high electric potential of 4.4 V to 4.5 V, thereby suppressing oxidation decomposition of the nonaqueous electrolyte.

In the nonaqueous solvent including the first solvent and the second solvent, a mixing ratio of the second solvent is preferably 70 vol % or more.

The nonaqueous electrolyte may further include an additive. The additive is not particularly limited, but may include, for example, vinylene carbonate (VC), vinylene acetate (VA), vinylene butyrate, vinylene hexanoate, vinylene crotonate, catechol carbonate, propane sultone, and lithium difluorophosphate ($LiPF_2O_2$).

In particular, it is preferred to include lithium difluorophosphate ($LiPF_2O_2$) as the additive. Accordingly, high temperature durability may be greatly improved.

The additive preferably has a concentration ranging from 0.1 mass % to 3 mass % with respect to 100 mass % of the nonaqueous electrolyte. A more preferable range of the concentration of the additive is from 0.5 mass % to 2.5 mass %.

(Separator)

As the separator, for example, there may be used a porous film or synthetic resin nonwoven fabric made of a material such as polyethylene (PE), polypropylene (PP), polyethylene terephthalate (PET), cellulose, or polyvinylidene fluoride (PVdF). Furthermore, a separator having inorganic compounds applied onto the porous film may also be used.

(Container Member)

As the container member, a bag-like container made of a laminate film or a metal case may be used.

Examples of the shape of the container member include flat form, square form, cylindrical form, coin-shaped, button-shaped, sheet form, stack form. Certainly, the container member may be that for a compact battery installed on mobile electronic devices, or a large battery installed on vehicles such as two-wheeled to four-wheeled automobiles.

As the laminate film, used is a multilayer film having a metal layer sandwiched between resin films. The metal layer is preferably an aluminum foil or an aluminum alloy foil, so as to reduce weight. The resin film may be, for example, a polymeric material such as polypropylene (PP), polyethylene (PE), nylon, or polyethylene terephthalate (PET). The laminate film may be heat-sealed to be formed into the shape of a container member. The film thickness of the laminate film is preferably 0.2 mm or less.

The metal case may be formed of aluminum or an aluminum alloy. The aluminum alloy preferably includes an element such as magnesium, zinc, and silicon. On the other hand, an amount of a transition metal such as iron, copper, nickel, or chromium included in the alloy is preferably 100 ppm, or less. Thereby, long-term reliability and heat radiating abilities under high temperature environments can be increased greatly. The wall thickness of the metal case is more preferably 0.5 mm or less, and still more preferably 0.2 mm or less.

(Negative Electrode Terminal)

The negative electrode terminal may be made of, for example, a material that is electrically stable within the potential range of 1.0 V to 3.0 V (vs. $Li/Li^+$) relative to lithium ion metal, and has electrical conductivity. The negative electrode terminal is preferably made of aluminum or an aluminum alloy including an element such as Mg, Ti, Zn, Mn, Fe, Cu, and Si. The negative electrode terminal is preferably made of the same material as the negative electrode current collector in order to reduce contact resistance with the negative electrode current collector.

A portion on the negative electrode current collector not having a negative electrode mixed-material layer formed thereon may be used as a negative electrode current collecting tab. The negative electrode terminal may be welded onto the negative electrode current collecting tab. In the case that an undercoat layer is formed on the surface of the current collector, even if the undercoat layer is formed on the surface of the negative electrode current collecting tab, the negative electrode terminal can be welded onto there. Alternatively, a portion without the undercoat layer formed thereon may be treated as the negative electrode current collecting tab, and the negative electrode terminal may be welded there.

(Positive Electrode Terminal)

The positive electrode terminal may be made of, for example, a material that is electrically stable within the potential range of 3.0 V to 4.5 V (vs. Li/Li$^+$) relative to lithium ion metal, and has electrical conductivity. The positive electrode terminal is preferably made of aluminum or an aluminum alloy including an element such as Mg, Ti, Zn, Mn, Fe, Cu, and Si. The positive electrode terminal is preferably made of the same material as the positive electrode current collector in order to reduce contact resistance with the positive electrode current collector.

According to the aforementioned first embodiment, a nonaqueous electrolyte secondary battery can be provided. The nonaqueous electrolyte secondary battery according to the embodiment includes the positive electrode, the negative electrode that includes the negative electrode current collector made of metallic foil, the titanium-containing metal oxide with which lithium ions are inserted into and extracted from, and the binder, and the nonaqueous electrolyte. The titanium-containing metal oxide and the binder form the negative electrode mixed-material layer disposed on the negative electrode current collector. The binder includes an acrylic resin. Taking the peel strength between the current collector and the negative electrode mixed-material layer to be represented by α (N/m), and the cutting strength measured by the surface and interfacial cutting method in the negative electrode mixed-material layer to be represented by β (N/m), α and β satisfy the relationship of $\alpha/\beta > 1.36 \times 10^{-2}$. The nonaqueous electrolyte secondary battery having the aforementioned configuration has the negative electrode that has excellent adhesion properties between the negative electrode current collector and the negative electrode mixed-material layer. Accordingly, the nonaqueous electrolyte secondary battery has excellent output performance, and excellent high temperature durability (cycle performance).

Second Embodiment

Next, a battery pack according to the second embodiment will be described in detail.

The battery pack according to the second embodiment includes at least one nonaqueous electrolyte secondary battery (that is, a single-battery) according to the first embodiment. When plural single-batteries are contained in the battery pack, each single-battery is arranged, such that the single-batteries are electrically connected in series, in parallel, or in a combination of in series and in parallel.

Such a battery pack will be described in detail with reference to FIGS. 5 and 6. The battery pack shown in FIG. 5 uses a flat nonaqueous electrolyte secondary battery shown in FIG. 1 as a single-battery 21.

A plural of single-batteries 21 are stacked such that the externally projected negative electrode terminals 6 and positive electrode terminals 7 are aligned in the same direction and fastened by an adhesive tape 22 to constitute a battery module 23. As shown in FIG. 6, these single-batteries 21 are electrically connected in series to each other.

A printed wiring board 24 is disposed to face toward a side surface, among the side surfaces of the single-batteries 21, from which the negative electrode terminals 6 and the positive electrode terminals 7 project. As shown in FIG. 6, a thermistor 25, a protective circuit 26, and an external power distribution terminal 27 are mounted on the printed wiring board 24. Additionally, an electric insulating plate (not shown) is mounted on the surface of the printed wiring board 24 facing toward the battery module 23 to avoid unnecessary contact with wiring of the battery module 23.

A positive electrode lead-side 28 is connected to the positive electrode terminal 7 positioned lowermost in the battery module 23. One end of the positive electrode-side lead 28 is inserted into a positive electrode connector 29 of the printed wiring board 24, and thereby electrically connecting the positive electrode-side lead 28 to the printed wiring board 24. A negative electrode-side lead 30 is connected to the negative electrode terminal 6 positioned uppermost layer in the battery module 23. One end of the negative electrode-side lead 30 is inserted into a negative electrode connector 31 of the printed wiring board 24, thereby electrically connecting the negative electrode-side lead 30 to the printed wiring board 24. The connectors 29 and 31 are connected to the protective circuit 26 via wirings 32 and 33 formed on the printed wiring board 24.

The thermistor 25 detects the temperature of the single-batteries 21. The pertaining detection signal is sent to the protective circuit 26. The protective circuit 26 can cut-off a positive-side wiring 34a and a negative-side wiring 34b between the protective circuit 26 and the external power distribution terminal 27 under a predetermined condition. The predetermined condition is, for example, when the temperature detected by the thermistor 25 rises to a predetermined temperature or higher. Also, the predetermined condition is when an over-charge, an over-discharge, or an over-current of the single-batteries 21 is detected. An over-charge or the like is detected for an individual single-battery 21 or all of the single-batteries 21 as a whole. When an individual single-battery 21 is detected, the battery voltage may be detected, or the positive electrode potential or negative electrode potential may be detected. In the latter case, a lithium electrode used as a reference electrode is inserted into each of the single-batteries 21. In the case of FIGS. 5 and 6, a wire 35 for voltage detection is connected to each of the single-batteries 21. A detection signal is sent to the protective circuit 26 through these wires 35.

Protective sheets 36 made of rubber or resin is arranged on each of three side surfaces of the battery module 23. More specifically, the protective sheets 36 are arranged on the three sides surfaces excluding the side surface from which the positive electrode terminals 7 and the negative electrode terminals 6 project.

The battery module 23 is housed in a housing container 37 together with each of the protective sheets 36 and the printed wiring board 24. That is, the protective sheets 36 are arranged on each of both inner side surfaces along a long-side direction and on one of the inner side surfaces along a short-side direction of the housing container 37. The printed wiring board 24 is arranged on an inner side surface opposite to the protective sheet 36 that is arranged along the short-side direction. The battery module 23 is positioned in a space surrounded by the protective sheets 36 and the printed wiring board 24. A cover 38 is mounted on top of the housing container 37.

Instead of the adhesive tape 22, a heat-shrinkage tape may be used to fix the battery module 23. In this case, protective sheets are arranged on both side surfaces of the battery module, and after the heat-shrinkage tape is wound around the battery module and protective sheets, the heat-shrinkage tape is allowed to heat-shrink to bind the battery module together.

Figure 5:
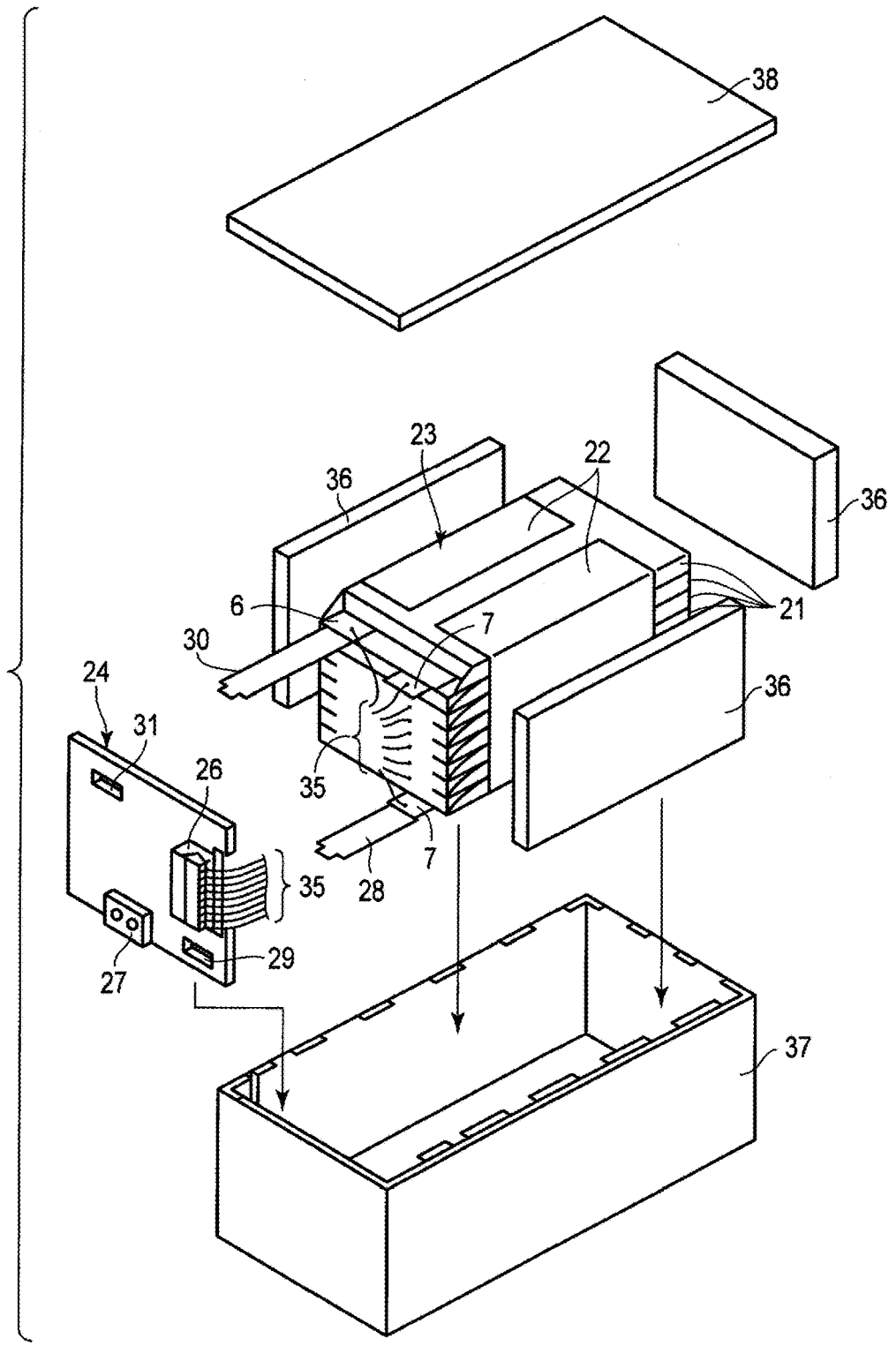
FIG. 5 is an exploded perspective view showing a battery pack according to the embodiment.
Figure 6:
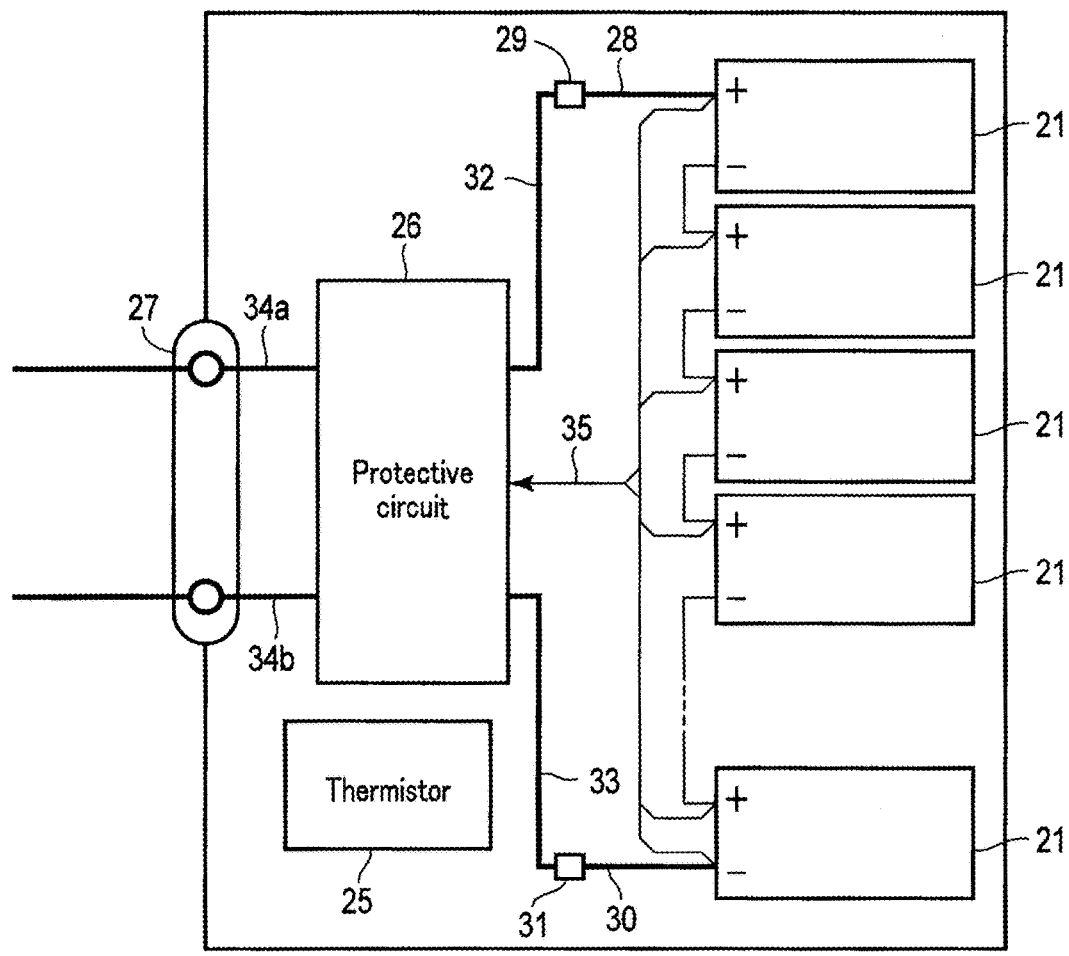
FIG. 6 is a block diagram showing an electric circuit of the battery pack of FIG. 5.

While FIGS. 5 and 6 show an embodiment in which the single-batteries 21 are connected in series, the single-batteries may be connected in parallel to increase the battery capacity. In addition, assembled battery packs may further be connected in series or in parallel.

The form of the battery pack is appropriately changed in accordance with its use. The use is preferably one in which excellent cycle properties are required to be exhibited when large current is extracted. Specifically, examples include use in power sources for digital cameras and on-board use in vehicles such as two-wheeled to four-wheeled hybrid electric automobiles, two-wheeled to four-wheeled electric automobiles, and power-assisted bicycles. In particular, the battery pack in which the nonaqueous electrolyte secondary battery having excellent high temperature durability is included is suitably used on-board for vehicles.

Furthermore, there is concern that the interior temperature of the engine compartment may become high. Since the battery pack according to the second embodiment includes the nonaqueous electrolyte secondary battery having excellent durability at high temperature, the battery pack can be used favorably, even when disposed in the engine compartment of an automobile.

According to the aforementioned second embodiment, a battery pack can be provided. The battery pack according to the embodiment includes at least one nonaqueous electrolyte secondary battery according to the first embodiment. Thus, the battery pack can exhibit high output and high durability at high temperature.

EXAMPLES

Examples will be described below, but the present invention is not limited to the examples described below, so long as the present invention does not deviate from the scope and spirit thereof.

Examples 1 to 13

Example 1

A nonaqueous electrolyte secondary battery similar to the nonaqueous electrolyte secondary battery shown in FIGS. 1 and 2 was produced by the procedure described below.

<Production of Negative Electrode>

With respect to a negative electrode active material, prepared were lithium titanate ($Li_4Ti_5O_{12}$) particles having a spinel structure, where a lithium inserting and extracting potential relative to an electrode potential of lithium metal ranges from 2 V to 1.3 V (vs. Li/Li$^+$), and having an average diameter of primary particles of 0.8 μm.

90 wt % of the lithium titanate, 5 wt % of acetylene black as an electro-conductive agent, and 5 wt % of polyacrylonitrile as a binder were mixed and added to N-methylpyrrolidone (NMP) to have a solid content ratio of 70 wt %. The mixture was mixed by a planetary mixer (HIVIS DISPER MIX 3D-05 manufactured by PRIMIX Corporation), and the solid content ratio thereof was gradually reduced by adding NMP to prepare a slurry.

The slurry was subjected to wet grinding/dispersion processing by using a continuous bead mill (RMH-03 manufactured by AIMEX Co., Ltd.) under the conditions at a rotational speed of 1500 rpm, and a flow rate of 30 cc/min.

Next, the slurry was applied onto both of reverse surfaces of a negative electrode current collector, which was an aluminum foil having a thickness of 15 μm and having an undercoat layer (carbon resin layer) of 1 μm thickness formed on both of reverse surfaces thereof, at an application speed of 0.75 m/min by a slot-die coating device (manufactured by Yasui seiki co., ltd.), and was dried at a drying temperature of 140° C. At this time, portions were left remaining on the negative electrode current collector, where the slurry was not applied on the surfaces thereof.

The obtained coated electrode was subjected to press processing at a press temperature of 25° C. by a roll press device (manufactured by Ono Roll Co., Ltd.) to form a negative electrode mixed-material layer, in which the thickness per surface is 20 μm, and the electrode density is 2.0 g/cm$^3$, on the negative electrode current collector. Then, the portions of the negative electrode current collector where the negative electrode mixed-material layer was not formed on the surface thereof were punched out in a strip-like shape to form a negative electrode current collecting tab. The negative electrode was produced by the above process.

<Production of Positive Electrode>

With respect to a positive electrode active material, lithium-nickel-manganese-cobalt oxide ($LiNi_{0.34}Co_{0.33}Mn_{0.33}O_2$) particles having a main particle diameter of 7.5 μm were prepared. 90 wt % of the lithium-nickel-manganese-cobalt oxide, 3 wt % of acetylene black and 2 wt % of graphite powder as electro-conductive agents, and 5 wt % of polyacrylic acid (average molecular weight of four hundred and fifty thousand) as a binder were mixed and dispersed into N-methylpyrrolidone (NMP) solvent to prepare a slurry. The slurry was applied onto both of reverse surfaces of a positive electrode current collector, which was an aluminum foil having a thickness of 15 μm. At this time, portions were left remaining on the positive electrode current collector, where the slurry was not applied on the surfaces thereof.

The applied slurry was dried and subjected to press processing to form a positive electrode mixed-material layer having the electrode density of 3.2 g/cm$^3$ on the positive electrode current collector. The weight of the positive electrode was adjusted to be 1.1 times of the weight of the negative electrode. Then, the portions of the positive electrode current collector where the positive electrode mixed-material layer was not formed on the surfaces thereof were punched out in a strip-like shape to form a positive electrode current collecting tab. The positive electrode was produced by the above process.

<Production of Electrode Group>

The positive electrode, a separator having a thickness of 20 μm, the negative electrode, and the separator were stacked in the order given, and wound in a spiral form. The obtained stack was subjected to heat pressing at 90° C. to prepare a flat electrode group having a width of 30 mm and a thickness of 3.0 mm. The obtained electrode group was housed in a pack made of a laminate film, and vacuum dried at 80° C. for 24 hours. As the laminate film, used was one having a configuration in which a polypropylene layer was formed on both surfaces of an aluminum foil having a thickness of 40 pun and having a total thickness of 0.1 mm.

<Preparation of Nonaqueous Electrolyte>

Propylene carbonate (PC) and diethyl carbonate (DEC) were mixed at a volume ratio of 1:1 to prepare a mixed solvent. 1.5 mol/L of $LiPF_6$ as electrolyte was dissolved into the mixed solvent to prepare a liquid non-aqueous electrolyte.

<Production of Nonaqueous Electrolyte Secondary Battery>

The liquid nonaqueous electrolyte was put into the laminate film pack housing the electrode group. Then, the pack was completely sealed by heat sealing to produce a nonaqueous electrolyte secondary battery (design capacity of 1 Ah) having the configuration shown in FIG. 1 and having a width of 35 mm, a thickness of 3.5 mm, and a height of 65 mm. This pack was used as a secondary battery of Example 1.

The negative electrode active material and binder species used for producing the negative electrode and the positive electrode active material used for producing the positive electrode in Example 1 described above and Examples 2 to 13 described below, are summarized in Table 1. The presence or absence of undercoat layer and the undercoat layer thickness in the negative electrode current collector are summarized in Table 2. The conditions of negative electrode production (application speed of slurry, drying temperature of slurry, and press temperature) in Examples 1 to 13 are summarized in Table 3. Table 3 further indicates the peel strength α between the negative electrode current collector and the negative electrode mixed-material layer, the cutting strength β in the negative electrode mixed-material layer, and the ratio thereof (α/β) that were obtained as described later with respect to Examples 1 to 13.

TABLE 1

|  | Negative electrode active material | Binder species (negative electrode) | Positive electrode active material |
|---|---|---|---|
| Example 1 | $Li_4Ti_5O_{12}$ (90 wt %) | polyacrylonitrile (5 wt %) | $LiNi_{0.34}Co_{0.33}Mn_{0.33}O_2$ (90 wt %) |
| Example 2 | $Li_4Ti_5O_{12}$ (90 wt %) | polyacrylonitrile (5 wt %) | $LiNi_{0.34}Co_{0.33}Mn_{0.33}O_2$ (90 wt %) |
| Example 3 | $Li_4Ti_5O_{12}$ (90 wt %) | polyacrylonitrile (5 wt %) | $LiNi_{0.34}Co_{0.33}Mn_{0.33}O_2$ (90 wt %) |
| Example 4 | $Li_4Ti_5O_{12}$ (90 wt %) | polyacrylonitrile (3 wt %) + polyacrylic acid (average molecular weight of 450,000) (2 wt %) | $LiNi_{0.34}Co_{0.33}Mn_{0.33}O_2$ (90 wt %) |
| Example 5 | $Li_4Ti_5O_{12}$ (90 wt %) | polyacrylic acid (average molecular weight of 450,000) (3 wt %) | $LiNi_{0.34}Co_{0.33}Mn_{0.33}O_2$ (90 wt %) |
| Example 6 | $Li_4Ti_5O_{12}$ (90 wt %) | polyacrylic acid (average molecular weight of 450,000) (5.5 wt %) | $LiNi_{0.34}Co_{0.33}Mn_{0.33}O_2$ (90 wt %) |
| Example 7 | $Li_4Ti_5O_{12}$ (90 wt %) | polyacrylonitrile (5 wt %) | $LiNi_{0.34}Co_{0.33}Mn_{0.33}O_2$ (90 wt %) |
| Example 8 | $Li_4Ti_5O_{12}$ (90 wt %) | polyacrylonitrile (3 wt %) + polyacrylic acid (average molecular weight of 3,000,000) (2 wt %) | $LiNi_{0.34}Co_{0.33}Mn_{0.33}O_2$ (90 wt %) |
| Example 9 | $Li_4Ti_5O_{12}$ (90 wt %) | polyacrylic acid (average molecular weight of 3,000,000) (5 wt %) | $LiNi_{0.34}Co_{0.33}Mn_{0.33}O_2$ (90 wt %) |
| Example 10 | $TiO_2$ (90 wt %) | polyacrylonitrile (3 wt %) + polyacrylic acid (average molecular weight of 450,000) (1 wt %) | $LiNi_{0.34}Co_{0.33}Mn_{0.33}O_2$ (90 wt %) |
| Example 11 | $TiNb_2O_7$ (90 wt %) | polyacrylonitrile (3 wt %) + polyacrylic acid (average molecular weight of 450,000) (1 wt %) | $LiNi_{0.34}Co_{0.33}Mn_{0.33}O_2$ (90 wt %) |
| Example 12 | $Li_2Na_2Ti_6O_{14}$ (90 wt %) | polyacrylonitrile (3 wt %) + polyacrylic acid (average molecular weight of 450,000) (1 wt %) | $LiNi_{0.34}Co_{0.33}Mn_{0.33}O_2$ (90 wt %) |
| Example 13 | $Li_4Ti_5O_{12}$ (90 wt %) | polyacrylonitrile (5 wt %) | $LiMn_{0.8}Fe_{0.2}PO_4$ (90 wt %) |

TABLE 2

|  | Presence or absence of undercoat layer | Undercoat layer thickness (μm) |
|---|---|---|
| Example 1 | present | 1 |
| Example 2 | present | 1 |
| Example 3 | present | 1 |
| Example 4 | present | 1 |
| Example 5 | present | 0.3 |
| Example 6 | present | 2 |
| Example 7 | present | 0.3 |
| Example 8 | present | 0.3 |
| Example 9 | present | 2 |
| Example 10 | present | 0.3 |
| Example 11 | present | 0.3 |
| Example 12 | present | 0.3 |
| Example 13 | present | 1 |

TABLE 3

|  | Application speed (m/min) | Drying temperature (° C.) | Press temperature (° C.) | Peel strength α (N/m) | Cutting strength β (N/m) | α/β (—) |
|---|---|---|---|---|---|---|
| Example 1 | 0.75 | 140 | 25 | 9.3 | 310 | $3.00 \times 10^{-2}$ |
| Example 2 | 1.0 | 140 | 25 | 7.4 | 350 | $2.10 \times 10^{-2}$ |
| Example 3 | 1.5 | 140 | 25 | 5.9 | 410 | $1.43 \times 10^{-2}$ |
| Example 4 | 1.0 | 140 | 25 | 10.0 | 410 | $2.45 \times 10^{-2}$ |

TABLE 3-continued

| | Application speed (m/min) | Drying temperature (° C.) | Press temperature (° C.) | Peel strength α (N/m) | Cutting strength β (N/m) | α/β (—) |
|---|---|---|---|---|---|---|
| Example 5 | 1.5 | 145 | 25 | 2.5 | 180 | $1.36 \times 10^{-2}$ |
| Example 6 | 1.5 | 145 | 25 | 7.4 | 210 | $3.50 \times 10^{-2}$ |
| Example 7 | 0.75 | 140 | 80 | 7.4 | 540 | $1.36 \times 10^{-2}$ |
| Example 8 | 0.5 | 135 | 80 | 36.8 | 600 | $6.13 \times 10^{-2}$ |
| Example 9 | 0.75 | 135 | 80 | 27.0 | 550 | $4.90 \times 10^{-2}$ |
| Example 10 | 0.5 | 135 | 80 | 21.6 | 402 | $5.36 \times 10^{-2}$ |
| Example 11 | 0.5 | 135 | 80 | 22.1 | 510 | $4.32 \times 10^{-2}$ |
| Example 12 | 0.5 | 135 | 80 | 19.6 | 400 | $4.90 \times 10^{-2}$ |
| Example 13 | 1.0 | 140 | 25 | 7.4 | 350 | $2.10 \times 10^{-2}$ |

Example 2

A slurry was prepared in a manner similar to the production of the negative electrode in Example 1. A negative electrode current collector similar to that used for the negative electrode of Example 1 was prepared. A negative electrode was produced in a manner similar to Example 1 except that the slurry was applied to both surfaces of the negative electrode current collector at an application speed of 1.0 m/min.

A nonaqueous electrolyte secondary battery of a design capacity of 1 Ah was produced in a manner similar to Example 1 except that the aforementioned negative electrode was used. This battery was used as a secondary battery of Example 2.

Example 3

A slurry was prepared in a manner similar to the production of the negative electrode in Example 1. A negative electrode current collector similar to that used for the negative electrode of Example 1 was prepared. A negative electrode was produced in a manner similar to Example 1 except that the slurry was applied to both surfaces of the negative electrode current collector at an application speed of 1.5 m/min.

A nonaqueous electrolyte secondary battery of a design capacity of 1 Ah was produced in a manner similar to Example 1 except that the aforementioned negative electrode was used. This battery was used as a secondary battery of Example 3.

Example 4

Lithium titanate ($Li_4Ti_5O_{12}$) particles that are the same as those used in Example 1 were prepared as negative electrode active material.

90 wt % of lithium titanate, 5 wt % of acetylene black as an electro-conductive agent, and 3 wt % of polyacrylonitrile and 2 wt % of polyacrylic acid (average molecular weight of four hundred and fifty thousand) as binders were mixed and dispersed into N-methylpyrrolidone (NMP) solvent to prepare a slurry.

A negative electrode was produced in a manner similar to Example 1 except that the slurry was applied to both surfaces of the negative electrode current collector at an application speed of 1.0 m/min.

A nonaqueous electrolyte secondary battery of a design capacity of 1 Ah was produced in a manner similar to Example 2 except that the aforementioned negative electrode was used. This battery was used as a secondary battery of Example 4.

Example 5

Lithium titanate ($Li_4Ti_5O_{12}$) particles that are the same as those used in Example 1 were prepared as negative electrode active material. 90 wt % of the lithium titanate, 7 wt % of acetylene black as an electro-conductive agent, and 3 wt % of polyacrylic acid (average molecular weight of four hundred and fifty thousand) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both or reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm³, on the negative electrode current collector. The application speed, drying temperature, and press temperature shown in Table 3 were adopted. Next, the portions of the negative electrode current collector where the negative electrode layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 5.

Example 6

Lithium titanate ($Li_4Ti_5O_{12}$) particles that are the same as those used in Example 1 were prepared as negative electrode active material. 90 wt % of the lithium titanate, 4.5 wt % of acetylene black as an electro-conductive agent, and 5.5 wt % of polyacrylic acid (average molecular weight of four hundred and fifty thousand) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 2 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm³, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 6.

Example 7

A slurry was prepared in a manner similar to the production of the negative electrode in Example 1. The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 m, and the electrode density is 2.0 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 7.

Example 8

Lithium titanate ($Li_4Ti_5O_{12}$) particles that are the same as those used in Example 1 were prepared as a negative electrode active material. 90 wt % of the lithium titanate, 5 wt % of acetylene black as an electro-conductive agent, and 3 wt % of polyacrylonitrile and 2 wt % of polyacrylic acid (average molecular weight of three million) as binders were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 8.

Example 9

Lithium titanate ($Li_4Ti_5O_{12}$) particles that are the same as those used in Example 1 were prepared as a negative electrode active material. 90 wt % of the lithium titanate, 5 wt % of acetylene black as an electro-conductive agent, and 5 wt % of polyacrylic acid (average molecular weight of three million) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 2 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 9.

Example 10

Monoclinic titanium composite oxide ($TiO_2$) in which the average diameter of primary particles is 2 μm was prepared as a negative electrode active material. 90 wt % of the titanium composite oxide, 6 wt % of acetylene black as an electro-conductive agent, and 3 wt % of polyacrylonitrile and 1 wt % of polyacrylic acid (average molecular weight of four hundred and fifty thousand) as binders were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 19 μm, and the electrode density is 2.0 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Example 10.

Example 11

Niobium-containing titanium composite oxide ($TiNb_2O_7$) in which the average diameter of primary particles is 1 μm was prepared as a negative electrode active material. 90 wt % of the niobium-containing titanium composite oxide, 6 wt % of acetylene black as an electro-conductive agent, and 3 wt % of polyacrylonitrile and 1 wt % of polyacrylic acid (average molecular weight of four hundred and fifty thousand) as binders were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 15 μm, and the electrode density is 2.4 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 10 except that the aforementioned negative electrode was used. This battery was used as a secondary battery of Example 11.

Example 12

Sodium-containing titanium composite oxide ($Li_2Na_2Ti_6O_{14}$) in which the average diameter of primary particles is 1 μm was prepared as a negative electrode active material. 90 wt % of the sodium-containing titanium composite oxide, 6 wt % of acetylene black as an electro-conductive agent, and 3 wt % of polyacrylonitrile and 1 wt % of polyacrylic acid (average molecular weight of four hundred and fifty thousand) as binders were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 3 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 10 except that the aforementioned negative electrode was used. This battery was used as a secondary battery of Example 12.

Example 13

A slurry was prepared in a manner similar to the production of the negative electrode in Example 1. A negative electrode current collector similar to that used for the negative electrode of Example 1 was prepared. A negative electrode was produced in a manner similar to Example 1 except that the slurry was applied to both surfaces of the negative electrode current collector at an application speed of 1.0 m/min.

With respect to a positive electrode active material, lithium manganese iron phosphate ($LiMn_{0.8}Fe_{0.2}PO_4$) particles having a main particle diameter of 9 μm were prepared as a positive electrode active material. 90 wt % of the lithium manganese iron phosphate, 3 wt % of acetylene black, 2 wt % of graphite powder as an electro-conductive agent, and 5 wt % of polyacrylonitrile as a binder were mixed and dispersed into N-methylpyrrolidone (NMP) solvent to prepare a slurry. The slurry was applied onto both of reverse surfaces of a positive electrode current collector, which was an aluminum foil having a thickness of 15 μm. At this time, portions were left remaining on the negative electrode current collector, where the slurry was not applied on the surfaces thereof.

The applied slurry was dried and subjected to press processing to form a positive electrode mixed-material layer having the electrode density of 2.0 g/cm$^3$ on the positive electrode current collector. The weight of the positive electrode was adjusted to be 1.1 times of the weight of the negative electrode. Then, the portions of the positive electrode current collector where the positive electrode mixed-material layer was not formed on the surfaces thereof were punched out in a strip-like shape to form a positive electrode current collecting tab. The positive electrode was produced by the above process.

A nonaqueous electrolyte secondary battery of a design capacity of 1 Ah was produced in a manner similar to Example 1 except that the aforementioned negative electrode and positive electrode were used. This battery was used as a secondary battery of Example 13.

Comparative Examples 1 to 11

The negative electrode active material and binder species used for producing the negative electrode and the positive electrode active material used for producing the positive electrode in Comparative Examples 1 to 11 described below are summarized in Table 4. The presence or absence of undercoat layer and the undercoat layer thickness in the negative electrode current collector are summarized in Table 5. The conditions of negative electrode production (application speed of slurry, drying temperature of slurry, and press temperature) in Comparative Examples 1 to 11 are summarized in Table 6. Table 6 further indicates the peel strength α between the negative electrode current collector and the negative electrode mixed-material layer, the cutting strength β in the negative electrode mixed-material layer, and the ratio thereof (α/β) in Comparative Examples 1 to 11 that were obtained as described later.

TABLE 4

| | Negative electrode active material | Binder species (negative electrode) | Positive electrode active material |
|---|---|---|---|
| Comparative Example 1 | $Li_4Ti_5O_{12}$ (90 wt %) | PVdF (5 wt %) | $LiNi_{0.34}Co_{0.33}Mn_{0.33}O_2$ (90 wt %) |
| Comparative Example 2 | $Li_4Ti_5O_{12}$ (90 wt %) | PVdF (3 wt %) | $LiNi_{0.34}Co_{0.33}Mn_{0.33}O_2$ (90 wt %) |
| Comparative Example 3 | $Li_4Ti_5O_{12}$ (90 wt %) | polyacrylic acid (average molecular weight of 450,000) (3 wt %) | $LiNi_{0.34}Co_{0.33}Mn_{0.33}O_2$ (90 wt %) |
| Comparative Example 4 | $Li_4Ti_5O_{12}$ (90 wt %) | polyacrylonitrile (5 wt %) | $LiNi_{0.34}Co_{0.33}Mn_{0.33}O_2$ (90 wt %) |
| Comparative Example 5 | $Li_4Ti_5O_{12}$ (90 wt %) | polyacrylonitrile (3 wt %) | $LiNi_{0.34}Co_{0.33}Mn_{0.33}O_2$ (90 wt %) |
| Comparative Example 6 | $Li_4Ti_5O_{12}$ (90 wt %) | polyacrylonitrile (7 wt %) | $LiNi_{0.34}Co_{0.33}Mn_{0.33}O_2$ (90 wt %) |
| Comparative Example 7 | $Li_4Ti_5O_{12}$ (90 wt %) | polyacrylic acid (average molecular weight of 3,000,000) (5 wt %) | $LiNi_{0.34}Co_{0.33}Mn_{0.33}O_2$ (90 wt %) |
| Comparative Example 8 | $TiO_2$ (90 wt %) | PVdF (high-molecular-type) (4 wt %) | $LiNi_{0.34}Co_{0.33}Mn_{0.33}O_2$ (90 wt %) |
| Comparative Example 9 | $TiNb_2O_7$ (90 wt %) | PVdF (high-molecular-type) (4 wt %) | $LiNi_{0.34}Co_{0.33}Mn_{0.33}O_2$ (90 wt %) |
| Comparative Example 10 | $Li_2Na_2Ti_6O_{14}$ (90 wt %) | PVdF (high-molecular-type) (4 wt %) | $LiNi_{0.34}Co_{0.33}Mn_{0.33}O_2$ (90 wt %) |
| Comparative Example 11 | graphite (95 wt %) | polyacrylic acid (average molecular weight of 450,000) (5 wt %) | $LiNi_{0.34}Co_{0.33}Mn_{0.33}O_2$ (90 wt %) |

TABLE 5

| | Presence or absence of undercoat layer | Undercoat layer thickness (μm) |
|---|---|---|
| Comparative Example 1 | present | 1 |
| Comparative Example 2 | not present | — |
| Comparative Example 3 | not present | — |
| Comparative Example 4 | not present | — |
| Comparative Example 5 | not present | — |
| Comparative Example 6 | present | 0.3 |
| Comparative Example 7 | not present | — |
| Comparative Example 8 | present | 0.3 |
| Comparative Example 9 | present | 0.3 |
| Comparative Example 10 | present | 0.3 |
| Comparative Example 11 | present | 0.3 |

TABLE 6

| | Application speed (m/min) | Drying temperature (° C.) | Press temperature (° C.) | Peel strength α (N/m) | Cutting strength β (N/m) | α/β (—) |
|---|---|---|---|---|---|---|
| Comparative Example 1 | 1.0 | 140 | 25 | 17.6 | 290 | $6.08 \times 10^{-2}$ |
| Comparative Example 2 | 1.0 | 140 | 25 | 3.9 | 260 | $1.51 \times 10^{-2}$ |
| Comparative Example 3 | 1.5 | 145 | 25 | 2.0 | 190 | $1.05 \times 10^{-2}$ |
| Comparative Example 4 | 1.0 | 140 | 25 | 3.4 | 450 | $0.76 \times 10^{-2}$ |
| Comparative Example 5 | — | — | — | — | — | — |
| Comparative Example 6 | 2.0 | 145 | 80 | 7.4 | 680 | $1.08 \times 10^{-2}$ |
| Comparative Example 7 | 0.75 | 135 | 80 | 8.3 | 620 | $1.34 \times 10^{-2}$ |
| Comparative Example 8 | 1.0 | 140 | 80 | 25.0 | 610 | $4.10 \times 10^{-2}$ |
| Comparative Example 9 | 1.0 | 140 | 80 | 26.0 | 650 | $4.00 \times 10^{-2}$ |
| Comparative Example 10 | 1.0 | 140 | 80 | 23.0 | 570 | $4.04 \times 10^{-2}$ |
| Comparative Example 11 | 1.0 | 140 | 80 | 35.0 | 650 | $5.65 \times 10^{-2}$ |

Comparative Example 1

Lithium titanate ($Li_4Ti_5O_{12}$) particles that are the same as those used in Example 1 were prepared as negative electrode active material. 90 wt % of the lithium titanate, 5 wt % of acetylene black as an electro-conductive agent, and 5 wt % of polyvinylidene fluoride (PVdF) (KF#1700 manufactured by KUREHA Corporation) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 1 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 m, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 1.

Comparative Example 2

Lithium titanate ($Li_4Ti_5O_{12}$) particles that are the same as those used in Example 1 were prepared as negative electrode active material. 90 wt % of the lithium titanate, 7 wt % of acetylene black as an electro-conductive agent, and 3 wt % of polyvinylidene fluoride (PVdF) (KF#1700 manufactured by KUREHA Corporation) as a binder were mixed and dispersed into N-methylpyrrolidone (NMP) solvent to prepare a slurry.

The slurry was applied onto both of reverse surfaces of a negative electrode current collector (without having an undercoat layer), which was an aluminum foil having a thickness of 15 μm. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 2.

Comparative Example 3

Lithium titanate ($Li_4Ti_5O_{12}$) particles that are the same as those used in Example 1 were prepared as negative electrode active material. 90 wt % of the lithium titanate, 7 wt % of acetylene black as an electro-conductive agent, and 3 wt % of polyacrylic acid (average molecular weight of four hundred and fifty thousand) as a binder were mixed and dispersed into N-methylpyrrolidone (NMP) solvent to prepare a slurry.

The slurry was applied onto both of reverse surfaces of a negative electrode current collector (without having an undercoat layer), which was an aluminum foil having a thickness of 15 μm. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 3.

Comparative Example 4

Lithium titanate ($Li_4Ti_5O_{12}$) particles that are the same as those used in Example 1 were prepared as negative electrode active material. 90 wt % of the lithium titanate, 5 wt % of acetylene black as an electro-conductive agent, and 5 wt % of polyacrylonitrile as a binder were mixed and dispersed into N-methylpyrrolidone (NMP) solvent to prepare a slurry.

The slurry was applied onto both of reverse surfaces of a negative electrode current collector (without having an undercoat layer), which was an aluminum foil having a thickness of 15 μm. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 4.

Comparative Example 5

Lithium titanate ($Li_4Ti_5O_{12}$) particles that are the same as those used in Example 1 were prepared as negative electrode active material. 90 wt % of the lithium titanate, 7 wt % of acetylene black as an electro-conductive agent, and 3 wt % of polyacrylonitrile as a binder were mixed and dispersed into N-methylpyrrolidone (NMP) solvent to prepare a slurry.

The slurry was attempted to be applied onto the surfaces of a negative electrode current collector (without having an undercoat layer), which was an aluminum foil having a thickness of 15 μm. However, the wettability of the negative electrode current collector relative to the slurry was low, and a repellent phenomenon occurred, which prevented producing a uniform negative electrode.

Thus, a nonaqueous electrolyte secondary battery was failed to be produced in Comparative Example 5.

Comparative Example 6

Lithium titanate ($Li_4Ti_5O_{12}$) particles that are the same as those used in Example 1 were prepared as negative electrode active material. 90 wt % of the lithium titanate, 3 wt % of acetylene black as an electro-conductive agent, and 7 wt % of polyacrylonitrile as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 μm and having an undercoat layer (carbon resin layer) of 0.3 μm thickness formed on both of reverse surfaces thereof. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 6.

Comparative Example 7

Lithium titanate ($Li_4Ti_5O_{12}$) particles that are the same as those used in Example 1 were prepared as negative electrode active material. 90 wt % of the lithium titanate, 5 wt % of acetylene black as an electro-conductive agent, and 5 wt % of polyacrylic acid (average molecular weight of three million) as a binder were mixed and dispersed into N-methylpyrrolidone (NMP) solvent to prepare a slurry.

The slurry was applied onto both of reverse surfaces of a negative electrode current collector (without having an undercoat layer), which was an aluminum foil having a thickness of 15 μm. At this time, portions were left remaining on the negative electrode current collector, where the slurry was not applied on the surfaces thereof.

The applied slurry was dried and subjected to press processing to form a negative electrode mixed-material layer, in which the thickness per one surface is 20 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 7.

Comparative Example 8

Monoclinic titanium composite oxide ($TiO_2$) that is the same as that used in Example 10 was prepared as a negative electrode active material. 90 wt % of the titanium composite oxide, 6 wt % of acetylene black as an electro-conductive agent, and 4 wt % of high-molecular-type polyvinylidene fluoride (PVdF) (KF#7300 manufactured by KUREHA Corporation) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 m and having an undercoat layer (carbon resin layer) of 0.3 μm thickness formed on both of reverse surfaces thereof, in a manner similar to Example 10.

The applied slurry was dried and subjected to press processing to form a negative electrode mixed-material layer, in which the thickness per one surface is 19 μm, and the electrode density is 2.0 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 8.

Comparative Example 9

Niobium-containing titanium composite oxide ($TiNb_2O_7$) that is the same as that used in Example 11 was prepared as a negative electrode active material. 90 wt % of the niobium-containing titanium composite oxide, 6 wt % of acetylene black as an electro-conductive agent, and 4 wt % of high-molecular polyvinylidene fluoride (PVdF) (KF#7300 manufactured by KUREHA Corporation) as a binder were mixed and dispersed into N-methylpyrrolidone (NMP) solvent to prepare a slurry.

The slurry was applied onto both of reverse surfaces of a negative electrode current collector which, was an aluminum foil having a thickness of 15 μm and having an undercoat layer (carbon resin layer) of 0.3 μm thickness formed on both of reverse surfaces thereof, in a manner similar to Example 11.

The applied slurry was dried and subjected to press processing to form a negative electrode mixed-material layer, in which the thickness per one surface is 15 μm, and the electrode density is 2.4 g/cm$^3$, on the negative electrode current collector. The application speed, drying temperature, and press temperature shown in Table 6 were adopted. Then, the portions of the negative electrode current collector where the negative electrode mixed-material layer was not formed on the surfaces thereof were punched out in a strip-like shape to form a negative electrode current collecting tab. The negative electrode was produced by the above process.

A nonaqueous electrolyte secondary battery of a design capacity of 1 Ah was produced in a manner similar to Example 1 except that the aforementioned negative electrode was used. This battery was used as a secondary battery of Comparative Example 9.

Comparative Example 10

Sodium-containing titanium composite oxide ($Li_2Na_2Ti_6O_{14}$) that is the same as that used in Example 12 was prepared as a negative electrode active material. 90 wt % of the sodium-containing titanium composite oxide, 6 wt % of acetylene black as an electro-conductive agent, and 4 wt % of high-molecular-type polyvinylidene fluoride (PVdF) (KF#7300 manufactured by KUREHA Corporation) as a binder were mixed and dispersed into N-methylpyrrolidone (NMP) solvent to prepare a slurry.

The slurry was applied onto both of reverse surfaces of a negative electrode current collector, which was an aluminum foil having a thickness of 15 µm and having an undercoat layer (carbon resin layer) of 0.3 µm thickness formed on both of reverse surfaces thereof, in a manner similar to Example 12.

The applied slurry was dried and subjected to press processing to form a negative electrode mixed-material layer, in which the thickness per one surface is 20 µm, and the electrode density is 2.0 g/cm$^3$, on the negative electrode current collector. The application speed, drying temperature, and press temperature shown in Table 6 were adopted.

A nonaqueous electrolyte secondary battery of a design capacity of 1 Ah was produced in a manner similar to Example 1 except that the aforementioned negative electrode was used. This battery was used as a secondary battery of Comparative Example 10.

Comparative Example 11

Graphite powder (mesophase microsphere) having an average particle diameter of 10 µm was prepared as a negative electrode active material. 95 wt % of the graphite powder, and 5 wt % of polyacrylic acid (average molecular weight of four hundred and fifty thousand) as a binder were added to N-methylpyrrolidone (NMP) to have a solid content ratio of 70 wt %. The component was mixed by a planetary mixer (HIVIS DISPER MIX 3D-05 manufactured by PRIMIX Corporation) to gradually reduce the solid content ratio by adding NMP to prepare a slurry.

The slurry was subjected to wet grinding-dispersion processing by using a continuous bead mill (RMH-03 manufactured by AIMEX Co., Ltd.) under the conditions at a rotational speed of 1500 rpm, and a flow rate of 30 cc/min.

Next, the slurry was applied onto both of reverse surfaces of a negative electrode current collector, which was a copper foil having a thickness of 15 µm and having an undercoat layer (carbon resin layer) of 0.3 µm thickness formed on both of reverse surfaces thereof, at an application speed of 1 m/min by a slot-die coating device (manufactured by Yasui seiki Co., Ltd.), and was dried at a drying temperature of 140° C.

The obtained coated electrode was subjected to press processing at a press temperature of 80° C. by a roll press device (manufactured by Ono Roll Co., Ltd.) to form a negative electrode mixed-material layer, in which the thickness per surface is 30 µm, and the electrode density is 1.4 g/cm$^3$, on the negative electrode current collector. Then, the portions of the negative electrode current collector where the negative electrode mixed-material layer was not formed on the surfaces thereof were punched out in a strip-like shape to form a negative electrode current collecting tab. The negative electrode was produced by the above process.

In Comparative Example 11, a liquid nonaqueous electrolyte was prepared by the process described below.

Ethylene carbonate (EC) and diethyl carbonate (DEC) were mixed at a volume ratio of 1:1 to prepare a mixed solvent. 1.5 mol/L of $LiPF_6$ as electrolyte was dissolved into the mixed solvent to prepare a liquid non-aqueous electrolyte.

A nonaqueous electrolyte secondary battery of a design capacity of 1 Ah was produced in a manner similar to Example 1 except that the aforementioned negative electrode and liquid nonaqueous electrolyte were used. This battery was used as a secondary battery of Comparative Example 11.

Figure 7:
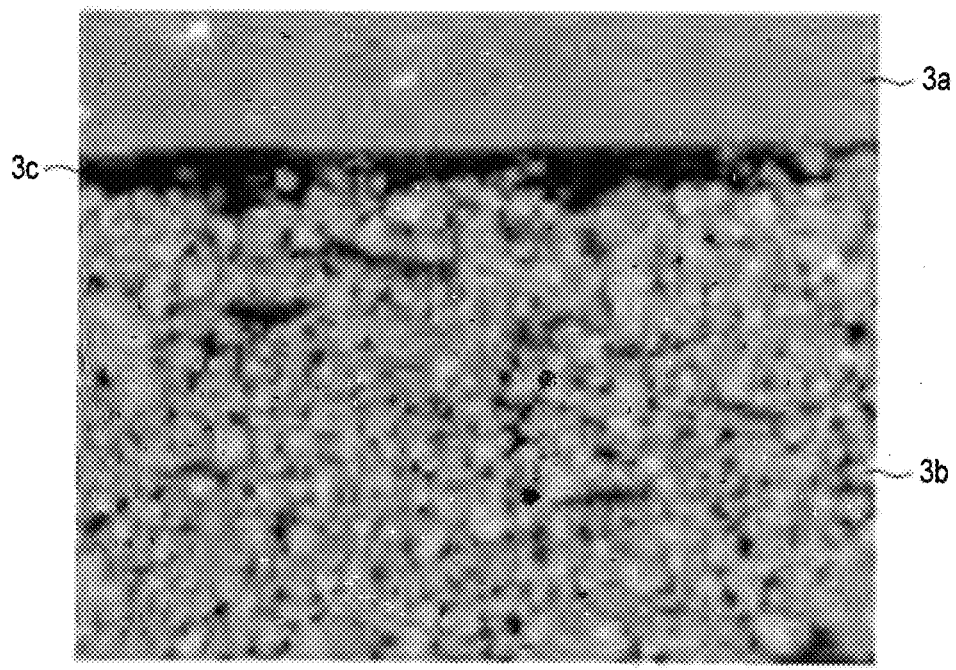
FIG. 7 is a scanning electron microscope (SEM) image of a cross-section of the negative electrode according to an embodiment.

FIG. 7 shows a cross-sectional SEM image of the negative electrode produced in Example 1 when the SEM measurement was performed as stated above. In Example 1, an aluminum foil which has an undercoat layer of a thickness of 1 µm formed on the surfaces thereof was used as the negative electrode current collector, as stated above. In the negative electrode produced in Example 1, an undercoat layer 3c is disposed between the aluminum foil (negative electrode current collector 3a) and a negative electrode mixed-material layer 3b, as shown in FIG. 7.

Figure 8:
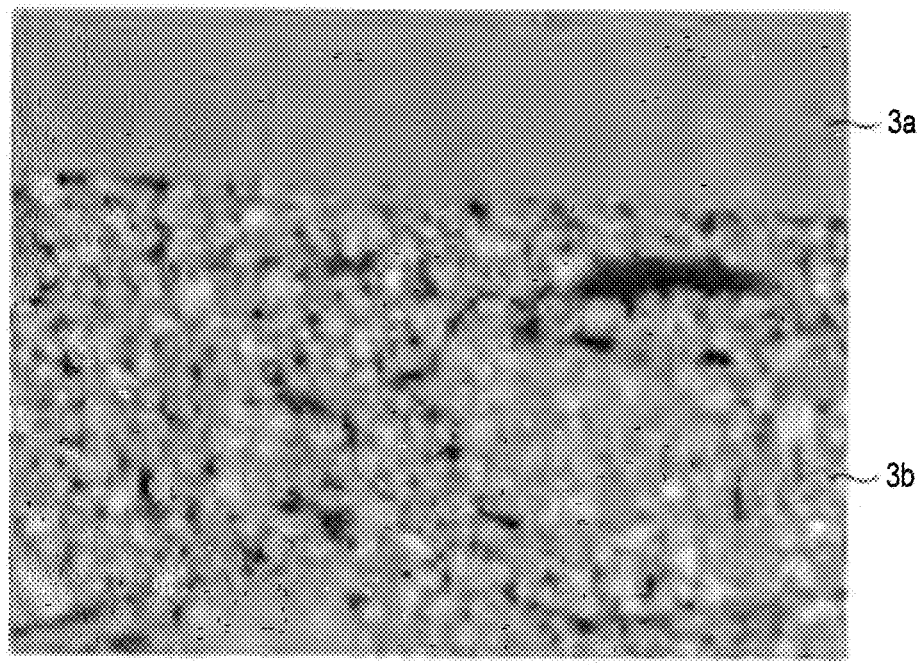
FIG. 8 is an SEM image of a cross-section of the negative electrode in a comparative example.

FIG. 8 shows a cross-sectional SEM image of the negative electrode produced in Comparative Example 4. In Comparative Example 4, an aluminum foil, having no undercoat layer, was used as the negative electrode current collector, as stated above. In the negative electrode produced in Comparative Example 4, the negative electrode mixed-material layer 3b is formed directly on the surfaces of the aluminum foil (negative electrode current collector 3a), as shown in FIG. 8.

<Initial Capacity Measurement>

Next, the initial capacity measurement was performed relative to the secondary battery produced in Examples 1-13 and Comparative Examples 1-4 and 6-11. The initial capacity measurement was performed by the following procedure.

First, each of the secondary batteries produced in Examples 1-9 and 13 and Comparative Examples 1-4 and 6-7 was, under a temperature condition of 25° C., subjected to a constant-current constant-voltage charging, where the battery was charged up to 2.7 V at a constant current of 1 A (1 C) and subsequently charged at constant voltage. This state was defined as SOC 100%. Hereafter, the capacity when the battery was discharged to 1.5 V at a current value of 1 A (1 C) was measured.

Each of the secondary batteries produced in Examples 10-11 and Comparative Examples 8-9 was, under a temperature condition of 25° C., subjected to constant-current constant-voltage charging, where the battery was charged up to 2.8 V at a constant current of 1 A (1 C), and subsequently charged at constant voltage. This state was defined as SOC 100%. Hereafter, the capacity when the battery was discharged to 1.5 V at a current value of 1 A (1 C) was measured.

Each of the secondary batteries produced in Example 10 and Comparative Example 8 was, under a temperature condition of 25° C., subjected to constant-current constant-voltage charging, where the battery was charged up to 3.0 V at a constant current of 1 A (1 C), and subsequently charged at constant voltage. This state was defined as SOC 100%. Hereafter, the capacity when the battery was discharged to 1.5 V at a current value of 1 A (1 C) was measured.

The secondary battery produced in Comparative Example 11 was, under a temperature condition of 25° C., subjected to constant-current constant-voltage charging, where the battery was charged up to 4.2 V at a constant current of 1 A (1 C), and subsequently charged at constant voltage. This state was defined as SOC 100%. Hereafter, the capacity when the battery was discharged to 2.75 V at a current value of 1 A (1 C) was measured.

Table 7 shows the results of the initial capacity measurement performed relative to the secondary batteries produced in Examples 1-13 and Comparative Examples 1-4 and 6-9.

TABLE 7

|  | Initial discharge capacity (Ah) | Large current discharge capacity ratio (%) | Cycle life (times) | Resistance increase ratio (%) |
|---|---|---|---|---|
| Example 1 | 1.04 | 85 | 2400 | 1.03 |
| Example 2 | 1.03 | 84 | 2300 | 1.04 |
| Example 3 | 1.04 | 84 | 2250 | 1.05 |
| Example 4 | 1.05 | 85 | 2400 | 1.02 |
| Example 5 | 1.05 | 87 | 2000 | 1.10 |
| Example 6 | 1.00 | 80 | 2400 | 1.04 |
| Example 7 | 1.05 | 83 | 2200 | 1.07 |
| Example 8 | 1.00 | 83 | 2500 | 1.01 |
| Example 9 | 1.02 | 81 | 2500 | 1.02 |
| Example 10 | 1.05 | 84 | 2200 | 1.03 |
| Example 11 | 1.05 | 84 | 2500 | 1.04 |
| Example 12 | 1.03 | 87 | 2300 | 1.02 |
| Example 13 | 1.01 | 80 | 3000 | 1.10 |
| Comparative Example 1 | 1.00 | 79 | 750 | 1.67 |
| Comparative Example 2 | 1.05 | 80 | 700 | 1.72 |
| Comparative Example 3 | 1.04 | 61 | 1350 | 1.41 |
| Comparative Example 4 | 1.03 | 62 | 1400 | 1.44 |
| Comparative Example 5 | — | — | — | — |
| Comparative Example 6 | 1.04 | 69 | 1500 | 1.39 |
| Comparative Example 7 | 0.99 | 60 | 1200 | 1.46 |
| Comparative Example 8 | 1.00 | 66 | 780 | 1.58 |
| Comparative Example 9 | 1.02 | 68 | 770 | 1.59 |
| Comparative Example 10 | 1.00 | 83 | 800 | 1.51 |
| Comparative Example 11 | 1.1 | 75 | — | — |

<Evaluation of Battery Performance>

Next, in order to evaluate the output performance of the battery, the large current discharge test, where the battery is continuously discharged at a current value of 1 A (1 C) and 30 A (30 C) from the state at a charging rate of 100% (SOC 100%), was performed under a temperature condition of 25° C. for each of the secondary batteries of Examples 1-13 and Comparative Examples 1-4 and 6-11. The ratio of discharge capacity ($C_{30}/C_1$) obtained when the battery was discharged at each current value is indicated as "large current discharge capacity ratio" in Table 7.

Next, in order to evaluate high temperature durability, the cycle test was performed relative to the secondary battery of Examples 1-13 and Comparative Examples 1-4 and 6-11, under a temperature condition of 80° C., to obtain the cycle life and the resistance increase ratio.

First, each secondary battery was discharged at a current value of 1 C (1 A) and 10 C (10 A) at 25° C. from the state where the charge rate is 50% (SOC 50%), and the cell resistance ($R_1$) was calculated from the battery voltage 10 seconds after discharge.

Next, the battery was, at 80° C., subjected to a 5 C/5 C cycle test where the battery is charged at a current value of 5 A (5 C) and discharged at a current value of 5 A (5 C). The conditions adopted for charge voltage, discharge termination voltage, etc. were the same as those for the initial capacity measurement. The cycle number at which the discharge capacity had become 80% of the initial capacity is indicated in Table 7 as a cycle life of each secondary battery at a high temperature (80° C.).

In addition, a resistance value ($R_{500}$) after 500 cycles was measured for each secondary battery after the 500th cycle has been performed, in a manner similar to measurement of the resistance value ($R_1$) after one cycle was performed. Based on the resistance value ($R_1$) after one cycle and the resistance value ($R_{500}$) after 500 cycles, a resistance increase ratio ($R_{500}/R_1$) was obtained. The results are also summarized in Table 7.

However, for the secondary battery of Comparative Example 11, swelling of the cell was observed at the time when the 60th cycle was performed during the 80° C. cycle test. In addition, it was observed that the resistance increase ratio reached 1.5 times at the time when the 100th cycle was performed, and thus, the test was stopped.

With respect to the negative electrode produced in Examples 1-13 and Comparative Examples 1-4 and 6-11, the peel strength α was measured using the electrode peel strength measurement device (rheometer) manufactured by Rheotech Co., Ltd., as explained in detail above. The force required to peel the negative electrode mixed-material layer by 2 cm from the negative electrode current collector (gf/2 cm) was obtained, and was recorded as a peel strength α (N/m) after unit conversion. For each Example and Comparative Example, the negative electrode was cut into 20 mm squares to prepare a sample for cutting strength evaluation. The cutting strength β (shearing force) in the negative electrode mixed-material layer of the evaluation sample was measured by the surface and interfacial cutting method explained in detail above, using a cutting strength measurement device SAICAS (registered trademark) DN-GS (manufactured by Dipla Wintes Co., Ltd.). As stated above, the obtained peel strength α, cutting strength β, and a ratio (α/β) are summarized in Tables 3 and 6.

As indicated in Table 7, the batteries in Examples 1-13 can exhibit more excellent output performance and longer cycle life in comparison to Comparative Examples 1-4 and 6-10, and are thus excellent in high temperature durability.

In addition, it is apparent as indicated in Table 7 that the batteries in Examples 1-13 have a lower resistance increase ratio under high temperature conditions, and thus have more excellent high temperature durability, in comparison to Comparative Examples 1-4 and 6-10.

It is also apparent that the secondary batteries of Comparative Examples 1-2 and 10 have excellent output performance, but have a shorter cycle life and a higher resistance increase ratio in comparison to the secondary batteries of Examples 1-13.

According to the aforementioned embodiments and examples, a nonaqueous electrolyte secondary battery is provided. The nonaqueous electrolyte secondary battery includes a positive electrode, a negative electrode, and a nonaqueous electrolyte. The negative electrode includes a negative electrode current collector and a negative electrode mixed-material layer disposed on the negative electrode current collector. The negative electrode current collector includes a metallic foil. The negative electrode mixed-material layer includes a titanium-containing metal oxide to and from which lithium ions are inserted and extracted, and a binder that includes an acrylic resin. The peel strength α (N/m) between the negative electrode current collector and the negative electrode mixed-material layer, and the cutting strength β (N/m) measured by the surface and interfacial cutting method in the negative electrode mixed-material layer satisfy the relationship of $\alpha/\beta > 1.36 \times 10^{-2}$. The nonaqueous electrolyte secondary battery has excellent output performance, and excellent high temperature durability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery comprising:
   a positive electrode;
   a negative electrode comprising a negative electrode current collector and a negative electrode mixed-material layer disposed on the negative electrode current collector, the negative electrode mixed-material layer comprising a titanium-containing metal oxide and a binder, the titanium-containing metal oxide having lithium ions inserted into and extracted from, the binder comprising an acrylic resin, and the negative electrode satisfying equation (I); and
   a nonaqueous electrolyte:

$$\alpha/\beta > 1.36 \times 10^{-2} \tag{I},$$

where "α" represents a peel strength (N/m) between the negative electrode current collector and the negative electrode mixed-material layer, and "β" represents a cutting strength (N/m) as measured according to a surface and interfacial cutting method in the negative electrode mixed-material layer.

2. The nonaqueous electrolyte secondary battery according to claim 1, wherein the negative electrode further satisfies equation (II):

$$\alpha/\beta < 4.9 \times 10^{-2} \tag{II}.$$

3. The nonaqueous electrolyte secondary battery according to claim 1, wherein the peel strength α ranges from 2.5 N/m to 27 N/m.

4. The nonaqueous electrolyte secondary battery according to claim 1, wherein the acrylic resin includes a nitrile group.

5. The nonaqueous electrolyte secondary battery according to claim 1, wherein the acrylic resin includes a polymer of the acrylic resin, a copolymer of the acrylic resin, or both the polymer of the acrylic resin and the copolymer of the acrylic resin.

6. A battery pack comprising the nonaqueous electrolyte secondary battery according to claim 1.

7. The battery pack according to claim 6, further comprising:
   an external power distribution terminal; and
   a protective circuit.

8. The battery pack according to claim 6, wherein the battery pack comprises a plural of the nonaqueous electrolyte secondary battery, the plural of nonaqueous electrolyte secondary battery being electrically connected in series, in parallel, or in a combination of in series and in parallel.

9. A vehicle comprising the battery pack according to claim 6.

10. The vehicle according to claim 9, wherein the battery pack is disposed in an engine compartment of the vehicle.

11. A negative electrode comprising:
    a negative electrode current collector; and
    a negative electrode mixed-material layer disposed on the negative electrode current collector, the negative electrode mixed-material layer comprising a titanium-containing metal oxide and a binder, the titanium-containing metal oxide having lithium ions inserted into and extracted from, and the binder comprising an acrylic resin, wherein
    the negative electrode satisfies equation (I):

$$\alpha/\beta > 1.36 \times 10^{-2} \tag{I},$$

where "α" represents a peel strength (N/m) between the negative electrode current collector and the negative electrode mixed-material layer, and "β" represents a cutting strength (N/m) as measured according to a surface and interfacial cutting method in the negative electrode mixed-material layer.

12. The negative electrode according to claim 11, wherein the negative electrode further satisfies equation (II):

$$\alpha/\beta < 4.9 \times 10^{-2} \tag{II}.$$

13. The negative electrode according to claim 11, wherein the peel strength α ranges from 2.5 N/m to 27 N/m.

14. The negative electrode according to claim 11, wherein the acrylic resin includes a nitrile group.

15. The negative electrode according to claim 11, wherein the acrylic resin includes a polymer of the acrylic resin, a copolymer of the acrylic resin, or both the polymer of the acrylic resin and the copolymer of the acrylic resin.

16. The nonaqueous electrolyte secondary battery according to claim 1, wherein the negative electrode current collector further comprises an undercoat layer on a surface thereof.

17. The negative electrode according to claim 11, wherein the negative electrode current collector further comprises an undercoat layer on a surface thereof.

18. The nonaqueous electrolyte secondary battery according to claim 16, wherein the undercoat layer comprises a carbon material and a resin, and the resin is fluorine-based resin, polyacrylic acid, acrylic resin, polyolefin resin, polyimide, polyamide, or polyamidemide.

19. The negative electrode according to claim 17, wherein the undercoat layer comprises a carbon material and a resin, and the resin is fluorine-based resin, polyacrylic acid, acrylic resin, polyolefin resin, polyimide, polyamide, or polyamidemide.

* * * * *